United States Patent
Shon et al.

(10) Patent No.: US 9,755,230 B2
(45) Date of Patent: Sep. 5, 2017

(54) ELECTRODE ACTIVE MATERIAL, ELECTRODE INCLUDING THE SAME, AND LITHIUM BATTERY INCLUDING THE ELECTRODE

(71) Applicant: Samsung Electronics Co., Ltd., Suwon-si, Gyeonggi-do (KR)

(72) Inventors: Jeongkuk Shon, Hwaseong-si (KR); Jaeman Choi, Hwaseong-si (KR); Junhwan Ku, Seongnam-si (KR); Kuntae Kwon, Suwon-si (KR); Moonseok Kwon, Hwaseong-si (KR); Minsang Song, Seongnam-si (KR); Seungsik Hwang, Seongnam-si (KR); Jiman Kim, Suwon-si (KR); Gwiok Park, Pyeongtaek-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 466 days.

(21) Appl. No.: 14/467,338

(22) Filed: Aug. 25, 2014

(65) Prior Publication Data
US 2015/0064560 A1 Mar. 5, 2015

(30) Foreign Application Priority Data
Aug. 30, 2013 (KR) .................. 10-2013-0104506

(51) Int. Cl.
| | | |
|---|---|---|
| *H01M 4/485* | (2010.01) |
| *H01M 4/50* | (2010.01) |
| *H01M 4/505* | (2010.01) |
| *H01M 4/62* | (2006.01) |
| *H01M 10/0525* | (2010.01) |
| *H01M 4/36* | (2006.01) |
| *H01M 4/525* | (2010.01) |
| *H01M 4/02* | (2006.01) |

(52) U.S. Cl.
CPC .......... *H01M 4/485* (2013.01); *H01M 4/505* (2013.01); *H01M 4/625* (2013.01); *H01M 4/366* (2013.01); *H01M 4/525* (2013.01); *H01M 10/0525* (2013.01); *H01M 2004/021* (2013.01)

(58) Field of Classification Search
CPC ............................................ H01M 4/50–4/525
See application file for complete search history.

(56) References Cited

U.S. PATENT DOCUMENTS

| | | |
|---|---|---|
| 6,806,003 B1 | 10/2004 | Yamaguchi et al. |
| 7,939,218 B2 | 5/2011 | Niu |
| 9,331,338 B2 | 5/2016 | Hwang et al. |
| 9,444,085 B2 | 9/2016 | Kwon et al. |
| 2008/0089829 A1 | 4/2008 | Ganapathiraman et al. |
| 2008/0187838 A1 | 8/2008 | Le |

(Continued)

FOREIGN PATENT DOCUMENTS

| | | |
|---|---|---|
| JP | 4768562 B2 | 6/2011 |
| KR | 1020130015719 A | 2/2013 |

(Continued)

*Primary Examiner* — Jonathan Crepeau
(74) *Attorney, Agent, or Firm* — Cantor Colburn LLP

(57) ABSTRACT

An electrode active material including an ordered mesoporous metal oxide; and at least one conductive carbon material disposed in a pore of the ordered mesoporous metal oxide. Also, an electrode including the electrode active material, and a lithium battery including the electrode.

21 Claims, 29 Drawing Sheets

(56) References Cited

U.S. PATENT DOCUMENTS

| | | | |
|---|---|---|---|
| 2009/0303660 A1* | 12/2009 | Nair | H01G 11/46 |
| | | | 361/502 |
| 2011/0183169 A1 | 7/2011 | Bhardwaj et al. | |
| 2013/0004850 A1* | 1/2013 | Shon | C01G 45/02 |
| | | | 429/224 |
| 2013/0040201 A1 | 2/2013 | Manthiram et al. | |
| 2013/0083496 A1 | 4/2013 | Franklin et al. | |
| 2013/0108907 A1 | 5/2013 | Bhardwaj et al. | |

FOREIGN PATENT DOCUMENTS

| | | |
|---|---|---|
| KR | 10-1246811 B1 | 3/2013 |
| KR | 1020140035689 A | 3/2014 |
| KR | 1020140061955 A | 5/2014 |
| KR | 1020140077622 A | 6/2014 |

\* cited by examiner

US 9,755,230 B2

ELECTRODE ACTIVE MATERIAL, ELECTRODE INCLUDING THE SAME, AND LITHIUM BATTERY INCLUDING THE ELECTRODE

CROSS-REFERENCE TO RELATED APPLICATION

This application claims the benefit of and priority to Korean Patent Application No. 10-2013-0104506, filed on Aug. 30, 2013, in the Korean Intellectual Property Office, and all the benefits accruing therefrom under 35 U.S.C. §119, the content of which is incorporated herein in its entirety by reference.

BACKGROUND

1. Field

The present disclosure relates to an electrode active material, an electrode including the electrode active material, and a lithium battery including the electrode.

2. Description of the Related Art

A representative example of a negative active material that is used in a lithium battery is a carbonaceous material such as graphite. Graphite provides a stable capacity and potential when cycled, and when intercalated with lithium, the graphite volume does not change. Accordingly, a battery that is manufactured using graphite has high stability. However, the capacity of graphite limits the applicability of graphite as a high-capacity battery material.

As the negative active material of a battery, a mixture of a carbonaceous material and a suitable negative active material may be used.

However, such a negative active material does not have satisfactory conductivity, capacity, and lifetime characteristics. Accordingly, there remains a need for an improved negative active material with improved performance in order to prepare a battery having improved performance, e.g., rate capability, capacity, and lifetime.

SUMMARY

Provided are electrode active materials having novel structures.

Provided are electrodes including the electrode active materials.

Provided are lithium batteries including the electrodes.

Additional aspects will be set forth in part in the description which follows and, in part, will be apparent from the description, or may be learned by practice of the presented embodiments.

According to an aspect, an electrode active material includes: an ordered mesoporous metal oxide; and at least one conductive carbon material disposed in a pore of the ordered mesoporous metal oxide.

According to another aspect, an electrode includes the electrode active material.

According to another aspect, a lithium battery includes the electrode.

According to another aspect, a method of preparing an electrode active material includes providing a composite including a conductive carbon and mesoporous silica; contacting the composite with a metal oxide precursor; heat-treating the composite and the metal oxide precursor to form an ordered mesoporous metal oxide; and removing the mesoporous silica to prepare the electrode active material, wherein the electrode active material includes an ordered mesoporous metal oxide, and at least one conductive carbon material disposed in a pore of the mesoporous metal oxide

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figures 1A, 1B:
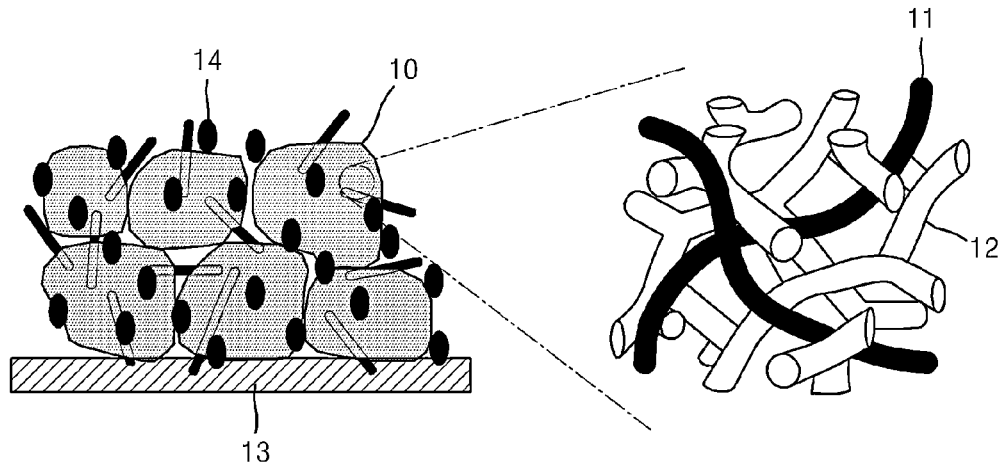
FIG. 1A is a schematic diagram of an embodiment of an electrode.
FIG. 1B is an enlarged view of the indicated portion of the electrode of FIG. 1A.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of an electrode active material, an electrode including the electrode active material, a lithium battery including the electrode, and a method of preparing the electrode active material will be disclosed in further detail.

An electrode active material according to an embodiment includes a composite including ordered mesoporous metal oxide, and at least one conductive carbon material disposed in, e.g., embedded in, the ordered mesoporous metal oxide.

The expression "embedded" means that the conductive carbon material penetrates, is inserted into, or in some cases protrudes through the ordered mesoporous metal oxide. In an embodiment, the conductive carbon material is disposed in a pore of the ordered mesoporous metal oxide.

The term "ordered mesoporous metal oxide" means that the pores of the metal oxide have an ordered porosity. An ordered mesoporous metal oxide may have pore diameters within about 0.01 to about 50 nanometers (nm), about 0.05 to about 25 nm, about 0.1 to about 10 nm, or within about 0.01 to about 5 nm of each other. In another embodiment, the pores of the ordered mesoporous material may have pore diameters within about ±30%, about ±20%, about ±10%, or about ±5% of each other. The pores may have a three-dimensional structure. Also, the pores may extend through a particle of the mesoporous metal oxide.

The pores of the mesoporous metal oxide may have an average diameter in a range of about 1 nm to about 50 nm, about 2 nm to about 35 nm, or about 4 nm to about 25 nm, and in some embodiments, in a range of about 2 nm to about 10 nm.

As described above, the composite may include the ordered mesoporous metal oxide and the conductive carbon material, wherein a part of the conductive carbon material or the whole the conductive carbon material may be disposed within, e.g., embedded in, the ordered mesoporous metal oxide, e.g., in the pores of the ordered mesoporous metal oxide. In an embodiment, about 50 to about 99 percent (%), about 60 to about 95%, or about 70 to about 90% of the conductive carbon material is within the pores of the mesoporous metal oxide.

Due to this structure of the electrode active material, lithium ions may be smoothly intercalated into and deintercalated from the electrode active material. Also, the electrode active material may be uniformly dispersed in an electrode including the electrode active material. Accordingly, an electrode including the electrode active material may have improved electrical characteristics.

FIG. 1 is a schematic view of an electrode including an electrode active material 10 and a conducting agent 14, according to an embodiment. Here, an example of a conductive carbon material is carbon nanotube ("CNT") 11.

Referring to FIG. 1A, the electrode includes a current collector 13 and an electrode active material layer formed on the current collector 13, wherein the electrode active material layer includes the electrode active material 10 and the conducting agent 14. Referring to a schematic enlarged view in FIG. 1B of the indicated portion of the electrode active material 10 in FIG. 1A, electrode active material 10 includes the conductive carbon material 11, which may be a carbon nanotube, for example, and an ordered mesoporous metal oxide 12. The conductive carbon material 11 is disposed within and may penetrate through or be inserted into the ordered mesoporous metal oxide 12.

Figure 2A:
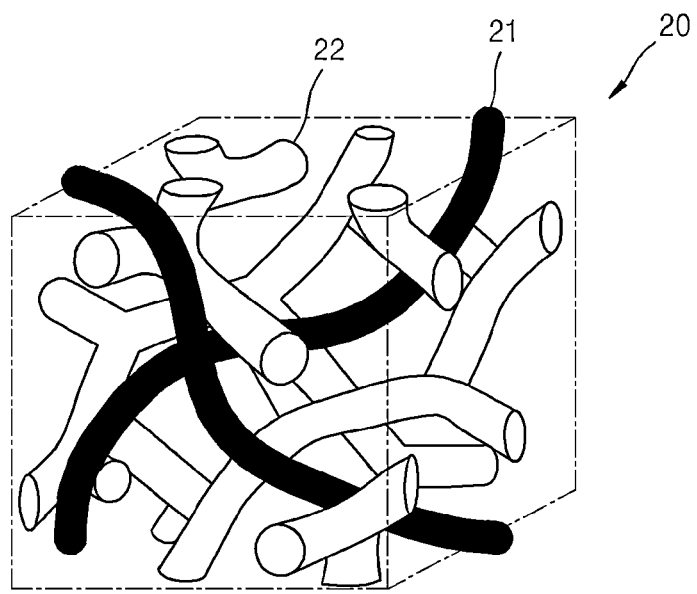
FIGS. 2A and 2B illustrate structures of an embodiment of an electrode active material.
Figure 2B:
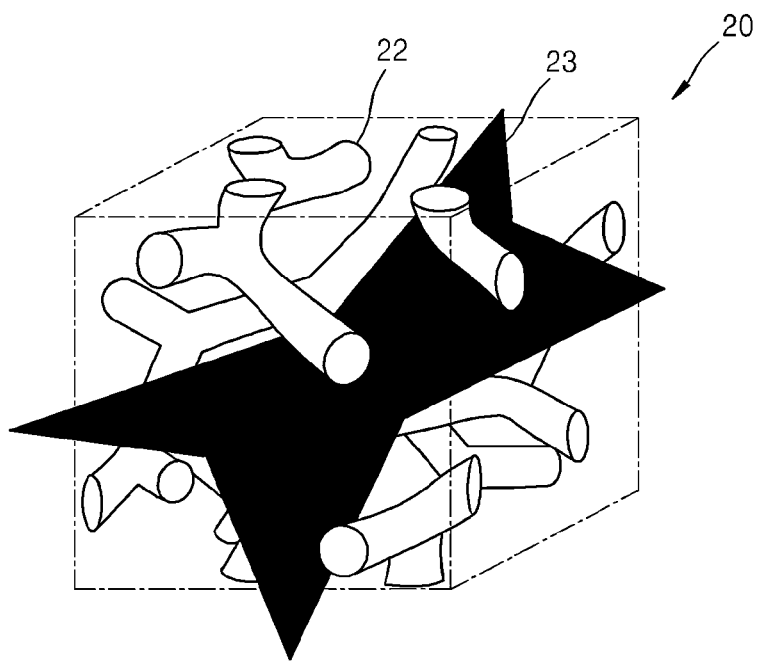

FIGS. 2A and 2B illustrate structures of an electrode active material according to another embodiment.

Referring to FIG. 2A, an electrode active material 20 includes an ordered mesoporous metal oxide 22 and CNT 21 as a conductive carbon material embedded in the ordered mesoporous metal oxide 22.

Referring to FIG. 2B, an electrode active material 20 includes an ordered mesoporous metal oxide 22 and graphene 23 as the conductive carbon material embedded in the ordered mesoporous metal oxide 22.

As shown in FIGS. 2A and 2B, the conductive carbon materials 21 and 23, such as CNT and graphene, are penetrated through or inserted into the mesoporous metal oxide 22, and while not wanting to be bound by theory, the electrode active material having such a structure may have improved electronic conductivity within the particles of the electrode active material. In addition, the electrode having the ordered mesoporous structure may also have improved conductivity of lithium ions, and the particles may be connected to each other to decrease interfacial resistance therebetween. As a result, the electrode active material may provide significantly improved capacity and initial efficiency.

The disclosed electrode active material includes the ordered mesoporous metal oxide, and thus may easily tolerate stress caused by volumetric expansion during charge and discharge. Also, due to the pores of the ordered mesoporous metal oxide, the electrode active material has a very large specific surface area, and thus the contact area between the electrode active material and an electrolyte may be increased. Also, since the electrode active material has a network structure including the conductive carbon material within the pores of the mesoporous metal oxide and optionally between particles of the mesoporous metal oxide, resistance may decrease, and accordingly power loss may decrease. Also, because the pores of the electrode active material may be orderly arranged, an electrochemical reaction may occur more uniformly, and thus a local loss or deterioration of the electrode active material may be prevented or reduced.

The ordered mesoporous metal oxide may include at least one of tin oxide, iron oxide, cobalt oxide, nickel oxide, zinc oxide, manganese oxide, molybdenum oxide, and bismuth oxide. In some embodiments, the ordered mesoporous metal oxide may include at least one of ordered mesoporous manganese oxide and ordered mesoporous molybdenum oxide. Use of an ordered mesoporous manganese oxide is specifically mentioned.

According to an embodiment, an electrode active material may include an ordered mesoporous manganese oxide represented by Formula 1:

$$Mn_xO_y \qquad \text{Formula 1}$$

wherein $1 \leq x \leq 3$, $1 \leq y \leq 4$, $2 \leq x+y \leq 7$, and $0 < y/x < 2$. In an embodiment, x may be $1 < x < 3$, or $1.5 \leq x \leq 2.5$. Also y may be $1 < y < 4$ or $1.5 \leq y \leq 3.5$.

The ordered mesoporous manganese oxide includes a plurality of ordered mesopores, and thus may easily tolerate volumetric expansion during charge and discharge. Also, and while not wanting to be bound by theory, due to the plurality of nano-sized pores of the ordered mesoporous manganese oxide, the electrode active material has a very large specific surface area, and thus the contact area between the electrode active material and an electrolyte may be increased. In addition, a framework of the ordered mesoporous manganese oxide has a thickness of several nanometers. Thus, the diffusion path of lithium ions in the framework may be shortened and high-rate characteristics may be improved.

In the case of nanoparticles that have the same size as that of the framework of the ordered mesoporous manganese oxide, a resistance may occur between the nanoparticles. However, since the framework of the ordered mesoporous manganese oxide has a networked structure, the resistance may be reduced and accordingly power loss may be decreased or effectively prevented.

Since the mesopores of the electrode active material are orderly arranged, an electrochemical reaction may uniformly occur, and thus a local loss or deterioration of the electrode active material may be preventable.

The ordered mesoporous manganese oxide may be $Mn_3O_4$ or $MnO_2$.

Examples of the conductive carbon material may be graphene, carbon nanotube ("CNT"), carbon black, graphite nanofiber, fullerene, graphite, or a combination thereof.

The conductive carbon material may function as a support against a volumetric change of the mesoporous manganese oxide during charge and discharge of the electrode active material to reduce any physical structural change of the electrode active material. Accordingly, lifetime characteristics of a lithium battery including an electrode including the electrode active material may be improved.

The term "graphene" refers to a compound consisting of carbon atoms that are bonded by $sp^2$-bonding to form a two-dimensional atomic planar structure. A plurality of graphene layers is often referred to in the art as graphite, however, for convenience, "graphene" or "a graphene sheet," as used herein, may comprise one or more layers of graphene. Graphene, which is used as the conductive carbon, may have a single layer of carbon, or may comprise multiple layers of carbon. Accordingly, the thickness of the single-graphene layer may be substantially the same as a diameter of a carbon atom. The multi-graphene layer refers to a layer that includes a plurality of graphene layers stacked in a direction perpendicular to the direction in which carbon atoms of one graphene layer extend. The multi-graphene layer may be a layer formed by stacking two to ten, for example, two to five graphene sheets.

At 31.83 megaPascals (MPa), the electrode active material may have a conductivity of about $2.0 \times 10^{-5}$ Siemens per centimeter (S/cm) to about $1.0 \times 10^{-2}$ S/cm, about $5.0 \times 10^{-5}$ S/cm to about $5.0 \times 10^{-3}$ S/cm, or about $1.0 \times 10^{-4}$ S/cm to about $1.0 \times 10^{-3}$ S/cm. The electrode active material having such a range of conductivity may be useful in a lithium battery.

The electrode active material may have the disclosed ordered mesoporous structure, and the porosity of the electrode active material may be confirmed by a peak in a low angle X-ray diffraction spectrum.

In a low angle X-ray diffraction spectrum, a peak of the electrode active material with respect to a (210) plane may observed at a Bragg (2θ) angle of about 0.5° to about 1.5°, for example about 0.6° to about 1.4°, or about 0.7° to about 1.3°, when using Cu Kα radiation.

For example, the electrode active material may have, in a low angle X-ray diffraction spectrum, a mesostructure of tetragonal $I4_1/a$ symmetry, or a sub-structure thereof. The material may have an $Ia\bar{3}d$ structure. This indicates that the electrode active material has a highly ordered three-dimensional pore structure and a framework structure.

The thickness of the framework that forms a wall between adjacent pores of the electrode active material may be about 5 nm or more, e.g., about 5 to about 100 nm, or about 8 to about 50 nm. For example, the thickness of the framework may be in a range of about 5 nm to about 20 nm. For example, the thickness of the framework may be in a range of about 5 nm to about 10 nm.

The specific surface area of the electrode active material may be in a range of about 50 square meters per gram ($m^2/g$) to about 250 $m^2/g$. For example, the specific surface area of the electrode active material may be in a range of about 75 $m^2/g$ to about 200 $m^2/g$, or about 100 $m^2/g$ to about 150 $m^2/g$. When the specific surface area is within the ranges described above, the electrode active material may contribute to electrical performance improvement of a lithium battery, a capacitor, or the like. The specific surface area may be adjusted by controlling the size of the pore or the size (or thickness) of the framework. When the electrode active material has such specific surface area ranges, a flow or diffusion path of lithium ions with respect to the electrode active material may be easily obtained, and stability of the electrode active material may be secured.

The volume of the mesopores of the electrode active material may be in a range of about 0.1 cubic centimeters per gram ($cm^3/g$) to about 2 $cm^3/g$. For example, the volume of the mesopores of the electrode active material may be in a range of 0.2 $cm^3/g$ to about 1.5 $cm^3/g$, or about 0.5 $cm^3/g$ to about 1 $cm^3/g$. When the volume of the mesopores is within the ranges described above, the electrode active material may contribute to an electrical performance improvement of a lithium battery, a capacitor, or the like. The pore volume may be adjusted by controlling the size of the mesopore or the size (or thickness) of the framework. When the electrode active material has such pore volume ranges, a flow or diffusion path of lithium ions with respect to the electrode active material may be easily obtained, and stability of the electrode active material may be secured.

The mesopores of the electrode active material may be connected to each other to form a channel. Due to the formation of the channel, an electrolyte may easily permeate into the electrode active material and lithium ions may easily move.

An electrode active material according to another embodiment includes a composite including an ordered mesoporous manganese oxide and at least one conductive carbon material, such as CNT or graphene, embedded in the ordered mesoporous manganese oxide.

The electrode active material may be included in an electrode, for example, an electrode for a lithium battery. Accordingly, an electrode including the electrode active material may be provided. The electrode may be a positive or negative electrode for a lithium battery. For example, the electrode may be a negative electrode for a lithium battery.

In some embodiments, an electrode active material includes a composite including ordered mesoporous $SiO_2$ and at least one graphene as a conductive carbon material embedded in the ordered mesoporous $SiO_2$.

A method of preparing the negative electrode for a lithium battery will now be disclosed in further detail.

To provide a negative active material, which is a composite including an ordered mesoporous metal oxide and a conductive carbon material, a conducting agent, a binder, and a solvent, the foregoing may be mixed to prepare a negative active material composition, and the prepared negative active material composition may be directly coated on a copper current collector to manufacture a negative electrode plate. Alternatively, the prepared negative active material composition may be cast onto a separate support and a negative active material film separated from the separate support, and the negative active material film may be laminated on a copper current collector to manufacture a negative electrode plate.

Examples of the conducting agent include carbon black, graphite particles, natural graphite, artificial graphite, acetylene black, carbon fiber; carbon nanotube; metal powder or metal fiber or metal tube of copper, nickel, aluminum, silver, or the like; and a conductive polymer such as a polyphenylene derivative. However, the conducting agent is not limited thereto, and may be any suitable material that is used as a conducting agent in the art.

Examples of the binder include a vinylidene fluoride/hexafluoropropylene copolymer, polyvinylidene fluoride, polyacrylonitrile, polymethylmethacrylate, polytetrafluoroethylene ("PTFE"), a mixture of the aforementioned polymers, and a styrene butadiene rubber-based polymer. Examples of the solvent are N-methylpyrrolidone ("NMP"), acetone, and water. The binder and the solvent are not limited to these materials and be any suitable material that is used in the art.

If desired, the negative active material composition may further include a plasticizer to form pores in an electrode plate.

Amounts of the negative active material, the conducting agent, the binder, and the solvent may be at the same level as used in a lithium battery, the details of which can be determined by one of skill in the art without undue experimentation. According to the purpose and structure of a lithium battery, one or more of the conducting agent, the binder, and the solvent may be omitted.

Also, the negative active material may further include, in addition to the electrode active material, a second electrode active material. The second electrode active material may be any suitable material that is used as a negative active material for a lithium battery in the art. For example, the second electrode active material may include a lithium metal, a metal that is alloyable with lithium, a transition metal oxide, a non-transition metal oxide, a carbonaceous material, or a combination thereof.

For example, the metal that is alloyable with lithium may be at least one of silicon (Si), tin (Sn), aluminum (Al), germanium (Ge), lead (Pb), bismuth (Bi), antimony (Sb), a Si—X alloy wherein X is an alkali metal, an alkali earth metal, a Group 13 element, a Group 14 element, a transition metal, and a rare earth element, or a combination thereof and is not Si; and a Sn-T alloy wherein T is an alkali metal, an alkali earth metal, a Group 13 element, a Group 14 element, a transition metal, a rare earth element, or a combination thereof and is not Sn, or the like. The element X or T may be at least one of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and polonium (Po).

For example, the transition metal oxide may be a lithium titanium oxide, a vanadium oxide, or a lithium vanadium oxide.

For example, the non-transition metal oxide may be $SnO_2$ or $SiO_x$ (0<x<2), or the like.

The carbonaceous material may be at least one of crystalline carbon and amorphous carbon. The crystalline carbon may be natural or artificial graphite of a shapeless, plate, flake, sphere, or fiber form. The amorphous carbon may be soft carbon (low-temperature sintered carbon), hard carbon, a mesophase pitch carbide, sintered coke, or the like.

Also, the negative electrode may be used in electrochemical cells other than a lithium battery, such as a super capacitor. In this case, the preparation method, the electrode composition, the electrode structure, or the like may be appropriately modified except for the use of the negative active material described above.

For example, an electrode for a capacitor may be manufactured by coating the negative active material on a metal structure that has been disposed on a conductive substrate. Alternatively, the negative active material may be directly coated on a conductive substrate to manufacture an electrode for a capacitor.

Like the negative electrode, a positive electrode including the electrode active material may also be prepared using any suitable materials that is used as a positive electrode for a lithium battery, and a method of preparing the positive electrode may be similar to the method described above.

A lithium battery according to another embodiment includes a positive or a negative electrode that includes the electrode active material. For example, the lithium battery may include a negative electrode including the electrode active material. An example of a method of preparing the lithium battery will now be disclosed in further detail.

First, a negative electrode including the electrode active material may be prepared as described above.

Next, a positive electrode may be prepared as follows. The positive electrode may be prepared in the same manner as used to prepare the negative electrode, except that a positive active material is used instead of the negative active material.

A positive active material composition may include the conducting agent, the binder, and the solvent, which have been used in preparing the negative electrode. A positive active material, a conducting agent, a binder, and a solvent are combined to prepare a positive active material composition. The positive active material composition may be coated directly on an aluminum current collector and dried to prepare a positive electrode plate including a positive active material layer. Alternatively, the positive active material composition may be cast onto a separate support and a film separated from the separate support may be laminated on an aluminum current collector to prepare a positive electrode plate including a positive active material layer.

The positive active material may be any suitable lithium-containing metal oxide that is used in the art. For example, the positive active material may include at least one composite oxide of lithium and a metal, wherein the metal may comprise cobalt, manganese, nickel, or a combination thereof. A detailed example of the positive active material may be a compound represented by any one of various formulas including $Li_aA_{1-b}L_bD_2$ where $0.90 \leq a \leq 1$ and $0 \leq b \leq 0.5$; $Li_aE_{1-b}L_bO_{2-c}D_c$ where $0.90 \leq a \leq 1$, $0 \leq b \leq 0.5$, and $0 \leq c \leq 0.05$; $LiE_{2-b}L_bO_{1-b}D_b$ where $0 \leq b \leq 0.5$ and $0 \leq c \leq 0.05$; $Li_aNi_{1-b-c}Co_bL_cD_\alpha$ where $0.90 \leq a \leq 1$, $0 \leq b \leq 0.5$, $0 \leq c \leq 0.05$, and $0 < \alpha \leq 2$; $Li_aNi_{1-b-c}Co_bL_cO_{2-\alpha}R_\alpha$ where $0.90 \leq a \leq 1$, $0 \leq b \leq 0.5$, $0 \leq c \leq 0.05$, and $0 < \alpha < 2$; $Li_aNi_{1-b-c}Co_bL_cO_{2-\alpha}R_2$ where $0.90 \leq a \leq 1$, $0 \leq b \leq 0.5$, $0 \leq c \leq 0.05$, and $0 < \alpha < 2$; $Li_aNi_{1-b-c}Mn_bL_cD_\alpha$ where $0.90 \leq a \leq 1$, $0 \leq b \leq 0.5$, $0 \leq c \leq 0.05$, and $0 < \alpha \leq 2$; $Li_aNi_{1-b-c}Mn_bL_cO_{2-\alpha}R_\alpha$ where $0.90 \leq a \leq 1$, $0 \leq b \leq 0.5$, $0 \leq c \leq 0.05$, and $0 < \alpha < 2$; $Li_aNi_{1-b-c}Mn_bL_cO_{2-\alpha}R_2$ where $0.90 \leq a \leq 1$, $0 \leq b \leq 0.5$, $0 \leq c \leq 0.05$, and $0 < \alpha < 2$; $Li_aNi_bE_cG_dO_2$ where $0.90 \leq a \leq 1$, $0 \leq b \leq 0.9$, $0 \leq c \leq 0.5$, and $0.001 \leq d \leq 0.1$; $Li_{a-}Ni_bCo_cMn_dGeO_2$ where $0.90 \leq a \leq 1$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1$ and $0.001 \leq b \leq 0.1$; $Li_aCoG_bO_2$ where $0.90 \leq a \leq 1$ and $0.001 \leq b \leq 0.1$; $Li_aMnG_bO_2$ where $0.90 \leq a \leq 1$ and $0.001 \leq b \leq 0.1$; $Li_aMn_2G_bO_4$ where $0.90 \leq a \leq 1$ and $0.001$ b $0.1$; $QO_2$; $QS_2$; $LiQS_2$; $V_2O_5$; $LiV_2O_5$; $LiZO_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulas above, A is Ni, Co, Mn, or a combination thereof; L is Al, Ni, Co, Mn, Cr, Fe, Mg, Sr, V, a rare earth element, or a combination thereof; D is O, F, S, P, or a combination thereof; E is Co, Mn, or a combination thereof; R is F, S, P, or a combination thereof; G is Al, Cr, Mn, Fe, Mg, La, Ce, Sr, V, or a combination thereof; Q is Ti, Mo, Mn, or a combination thereof; Z is Cr, V, Fe, Sc, Y, or a combination thereof; and J is V, Cr, Mn, Co, Ni, Cu, or a combination thereof.

For example, $LiCoO_2$, $LiMn_xO_{2x}$ (x=1 or 2), $LiNi_{1-x}Mn_xO_{2x}$ (0<x<1), $Ni_{1-x-y}Co_xMn_yO_2$ (0≤x≤0.5, 0≤y≤0.5), or $LiFePO_4$, or the like may be used.

A coating layer may be further formed on the lithium-containing metal oxide compound, or a combination of these compounds and a compound having a coating layer may also be used. The coating layer may comprise an oxide of a coating element, a hydroxide of a coating element, an oxyhydroxide of a coating element, an oxycarbonate of a coating element, a hydroxycarbonate of a coating element, or a combination thereof. The compound that forms the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. The coating layer formation process may comprise any suitable coating method, for example, spray coating or precipitating, that does not adversely affect properties of the positive active material. Details of the coating layer formation process may be determined by one of skill in the art without undue experimentation, and thus will not be further described herein in detail.

Amounts of the positive active material, the conductive agent, the binder, and the solvent may be at the levels as are used in a lithium battery. Then, a separator that is to be interposed between the positive electrode and the negative electrode may be prepared. The separator may be any suitable separator that is used in a lithium battery. For example, the separator may be a material that has a low resistance to migration of ions in an electrolyte and an excellent electrolyte-retaining ability. For example, the separator may include glass fiber, polyester, polyethylene, polypropylene, polytetrafluoroethylene ("PTFE"), or a combination thereof, each of which may be nonwoven or woven. For example, a separator for use in a lithium ion battery may be a foldable separator comprising polyethylene or polypropylene, and a separator for use in a lithium ion polymer battery may be a separator having an excellent organic electrolyte retaining capability.

For example, to prepare the separator, a polymer resin, a filler, and a solvent may be combined to prepare a separator composition. The separator composition may be directly coated and dried on an electrode, thereby forming a separator. Alternatively, the separator composition may be cast and dried on a support as a film, and then the separator film separated from the support and laminated on an electrode, thereby forming a separator.

A polymer resin that is used to produce the separator may be any suitable material that is used in a binder of an electrode plate. For example, the polymer resin may be a vinylidenefluoride/hexafluoropropylene copolymer, a polyvinylidene fluoride ("PVDF"), polyacrylonitrile, polymethylmethacrylate, or a combination thereof.

Next, an electrolyte may be prepared.

For example, the electrolyte may be an organic electrolytic solution. Also, the electrolyte may be solid. For example, the solid electrolyte may be boron oxide, lithium oxynitride, or the like, but is not limited thereto. For example, the solid electrolyte may be any suitable solid electrolyte that is used in the art. The solid electrolyte may be formed on the negative electrode by, for example, sputtering.

For example, an organic electrolytic solution may be prepared. The organic electrolytic solution may be prepared by dissolving a lithium salt in an organic solvent. The organic solvent may be any suitable organic solvent that is used in the art. For example, the organic solvent may comprise at least one of propylene carbonate, ethylene carbonate, fluoroethylene carbonate, butylene carbonate, dimethyl carbonate, diethyl carbonate, ethyl methyl carbonate (methylethyl carbonate), methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyl-1,3-dioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethyleneglycol, and dimethylether.

The lithium salt may comprise any suitable lithium salt that is used in the art. For example, at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ wherein x and y are natural numbers such as 1 to 10, LiCl, and LiI may be used.

Figure 3:
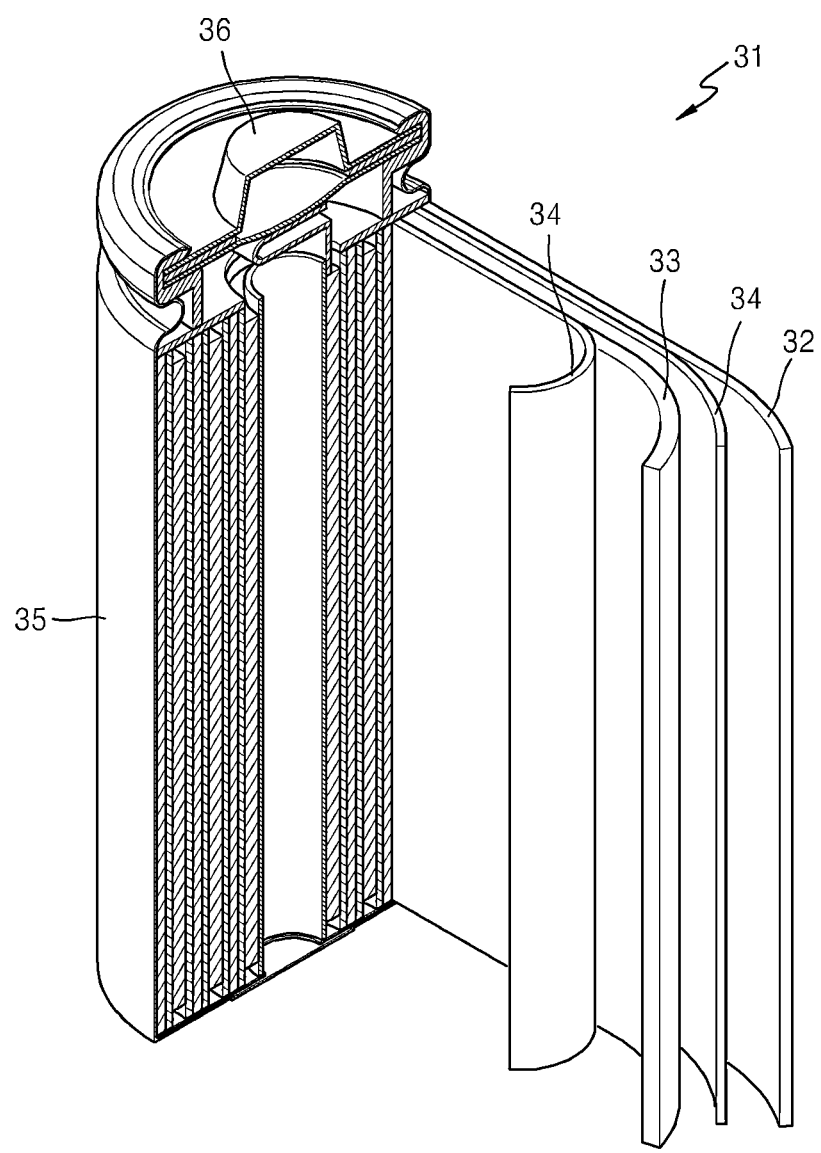
FIG. 3 is a schematic view of an embodiment of a lithium battery.

FIG. 3 is a schematic view of a lithium battery according to an embodiment. Referring to FIG. 3, a lithium battery 31 includes a positive electrode 33, a negative electrode 32, and a separator 34. The positive electrode 33, the negative electrode 32, and the separator 34 are wound or folded to be accommodated in a battery case 35. Subsequently, an organic electrolytic solution is loaded into the battery case 35 and then sealed with a cap assembly 36, thereby completing the preparation of the lithium battery 31. The battery case 35 may be cylindrical, rectangular, thin film-shaped, or the like. For example, the lithium battery 31 may be a large, thin film-type battery. Alternatively, the lithium battery 31 may be a lithium ion battery.

The separator is disposed between the positive electrode plate and the negative electrode plate to form a battery assembly. A plurality of battery assemblies are stacked in a bi-cell structure, and then impregnated with an organic electrolytic solution, and the obtained structure is housed in a pouch, followed by sealing, thereby completing the preparation of a lithium ion polymer battery.

In addition, a plurality of the battery assemblies may be stacked on each other to form a battery pack, and the battery pack may be used in various devices that require high capacity and high power output. For example, the battery pack may be used in a notebook computer, a smart phone, an electric vehicle, or the like.

In addition, the lithium battery may be used in an electric vehicle (EV) due to its storage stability at high temperature, excellent lifetime characteristics, and high-rate characteristics. For example, the lithium battery may be used in hybrid vehicles, such as a plug-in hybrid electric vehicle (PHEV).

A capacitor according to an embodiment includes an electrode including the electrode active material. For example, the capacitor may be a super capacitor having very high power accumulation capacity.

The capacitor may employ the electrode including the electrode active material. The capacitor may be prepared by disposing a separator between a positive electrode and a negative electrode, followed by injection of an electrolytic solution into the separator. The positive electrode used herein may be any suitable electrodes that are used in the art.

A solvent used in the electrolytic solution may comprise acetonitrile, dimethyl ketone, propylene carbonate, or a combination thereof. The electrolyte used in the electrolytic solution may include an alkali metal salt that has a solubility of 0.01 mole/L or more with respect to the solvent and that is electrically inactive in a working voltage range of the capacitor. Examples of the alkali metal salt are lithium perchlorate, lithium tetrafluoroborate, lithium hexafluorophosphate, and the like. The electrolytic solution may further include additives for improving properties of the capacitor. For example, a stabilizer or a thickener may be used.

The lithium battery and/or the capacitor may include the electrode active material as a positive active material.

A method of preparing the electrode active material according to an embodiment will now be described in further detail.

First, a composite including conductive carbon and mesoporous silica is prepared, and a metal oxide precursor is supplied thereto using the mesoporous silica of the composite as a template. Then, the template is removed, thereby eventually completing the preparation of the composite as an electrode active material including conductive carbon embedded in mesoporous metal oxide. A detailed description of the method will be provided below.

A metal oxide precursor is supplied to the composite including the conductive carbon and the mesoporous silica.

The metal oxide precursor may be a nitrate, a sulphate, a sulfite, an acetate, a chloride, or a salt including at least one of Sn, Fe, Co, Ni, Zn, Mn, Mo, and Bi.

The metal oxide precursor may be a manganese oxide precursor.

The manganese oxide precursor may comprise, for example, manganese nitrate (e.g., $Mn(NO_3)_2 \cdot 6H_2O$), manganese acetate (e.g., $Mn(CH_3COO)_2 \cdot xH_2O$, manganese chloride (e.g., $MnCl \cdot xH_2O$), or a combination thereof, but is not limited thereto. The manganese oxide precursor may be any suitable material that is used as a manganese oxide precursor in the art. In the manganese oxide precursor, x is an integer of 1 to 10.

The metal oxide precursor may be a mixture that is obtained by uniformly dispersing or dissolving the metal oxide precursor in a solvent, such as distilled water, alcohol, or the like.

The CNT-mesoporous silica composite to which the metal oxide precursor is supplied is heat treated.

The heating temperature may be in a range of about 300° C. to about 700° C. For example, the heating temperature may be in a range of about 300° C. to about 550° C. When the heating temperature is within the ranges described above, an ordered mesoporous manganese oxide may be appropriately prepared.

The heating may be performed in an inert gas atmosphere, an oxidizing atmosphere, or a reducing atmosphere. The reducing atmosphere may be an atmosphere comprising a reducing gas, such as hydrogen, and further optionally comprising nitrogen, argon, helium, hydrogen gas, or a combination thereof.

The inert gas atmosphere may be an atmosphere comprising nitrogen, argon, helium, hydrogen, or a combination thereof. The oxidizing atmosphere may be an atmosphere including oxygen. For example, the oxidizing atmosphere may include air.

In some embodiments, the heating includes a first heat treatment performed at a temperature in a range of about 400° C. to about 600° C. in an inert gas atmosphere including nitrogen and a second heat treatment performed at a temperature in a range of about 250° C. to about 350° C. in a reducing atmosphere including hydrogen.

The mesoporous silica may be selectively removed from the heat-treated resultant using an etchant.

The etchant may comprise hydrofluoric acid (HF), NaOH, and HF—$NH_4F$ (e.g., to provide a buffer), but is not limited thereto. The etchant may be an acid or a base.

After the removing of the mesoporous silica described above, a residual solvent may be present from the material used in the removing of the mesoporous silica or impurities may be further formed. In those cases, washing and drying processes may be further included to remove such residual solvents or impurities.

Any suitable solvent may be used in the washing process. The solvent may be acetone, ethanol, methanol, distilled water, or the like, but is not limited thereto.

After the washing of the solvents or impurities, the composite including the mesoporous metal oxide and the conductive carbon may be dried at room temperature (e.g., 25° C.) or at an elevated temperature of about 70° C. A method of drying the composite is not limited, and may be any suitable method that is used in the art.

In the removing of the mesoporous silica described above, a part of the mesoporous silica may be retained in the composite by adjusting a concentration of the etchant. Here, the retained mesoporous silica may function as a support against a structural change according to a volumetric change expansion during charge and discharge of the composite.

The composite including the conductive carbon and the mesoporous silica may be prepared as follows.

First, a surfactant, conductive carbon, and a solvent may be mixed and dispersed to prepare a conductive carbon-containing mixture. The conductive carbon-containing mixture may adjust pH thereof to 2 or less.

The conductive carbon use graphene, CNT, graphite, or the like.

Graphene and CNT may each undergo an activation treatment. For example, graphene and CNT, which are commercially available, may activated with an acid such as sulfuric acid or nitric acid, or a combination thereof, and an oxidizing agent such as potassium permanganate, followed by sonication.

When a pH of the conductive carbon-containing the mixture has been adjusted to 2 or less, a silicon salt, which will be described later, is mixed with the conductive carbon-containing mixture to form a mixture, and then the reaction of the mixture may be performed slowly to form the composite including a mesoporous silicon oxide and graphene. Accordingly, a long-ranged, ordered mesoporous silicon oxide may be formed on the graphene or CNT. That is, when a pH of the mixture is adjusted to 2 or less, the mesoporous silicon oxide may have a long-ranged regularity.

When pH of the conductive carbon-containing mixture is adjusted to 2 or less, an acid solution may be used, and the acid may be appropriately selected.

The acid solution may be, for example, a hydrochloric acid solution.

Next, a silicon precursor is added and mixed with the conductive carbon-containing mixture, and a first hydrothermal treatment of the resulting product is performed at a temperature in a range of about 30° C. to about 40° C. The silicon precursor may comprise tetraethylorthosilicate ("TEOS"), tetramethylorthosilicate ("TMOS"), sodium silicate ($Li_2SiO_3$), potassium silicate ($K_2SiO_3$), or a combination thereof, but is not limited thereto.

The first hydrothermal treatment may be performed in, for example, a thermostat. A treatment time of the first hydrothermal treatment may be selected according to a temperature of the hydrothermal treatment. For example, the first hydrothermal treatment may be performed for about 15 to about 30 hours.

Next, a second hydrothermal treatment of the product of the first hydrothermal treatment is performed at a temperature in a range of about 60° C. to about 160° C., or about 70° C. to about 150° C. The treatment time of the second hydrothermal reaction may be selected according to the heat temperature of the second hydrothermal treatment. For example, the second hydrothermal treatment may be performed for about 5 to about 30 hours. When the temperature of the second hydrothermal treatment is within the ranges described above, the electrode active material may be provided as a composite having a highly ordered three-dimensional mesoporous structure.

The hydrothermal treatment may be carried out in a two-step process as described above. When the hydrothermal treatment is performed within the above-described conditions, the electrode active material obtained may be a composite including conductive carbon and mesoporous silica and having a highly ordered three dimensional mesoporous structure.

When the hydrothermal treatment is carried out through the two-step process as described above, a conductive carbon-mesoporous silica composite having a highly ordered three dimensional mesoporous structure may be obtained, and accordingly the electrode active material may be prepared using the conductive carbon-mesoporous silica composite.

In the preparation method of the electrode active material, the heat-treated product is washed out with a solvent such as ethanol, and may be further heat treated at a temperature of 400° C. or less, for example, in a range of about 300° C. to about 400° C.

The surfactant may be removed by the washing using the solvent and thermal treatment.

The surfactant may comprise a cationic surfactant, an anionic surfactant, a polymeric surfactant, or a combination thereof. For example, the surfactant may comprise a cationic surfactant such as sodium dodecyl sulfate ("SDS") or sodium (bis-2-ethyl-hexyl) sulfosuccinate ("AOT"); an anionic surfactant such as cetyltrimethylammonium bromide ("CTAB") or cetyltrimethylammonium chloride ("CTACl"); or polymeric surfactants such as P123, F127, Brij56, and Brij78, each available from the BASF corporation or Sigma-Aldrich, or a combination thereof. In some embodiments, the surfactant may be polymeric surfactants such as P123, F127, Brij56, Pluronic 123, and Brij78, which have a relatively large molecular structure.

The surfactant may further comprise an auxiliary surfactant such as ethanol and/or butanol, in addition to the surfactant described above.

Amounts of the surfactant may be in a range of about 1,000 parts by weight to about 100,000 parts by weight, based on 100 parts by weight of the conductive carbon. Amounts of the auxiliary surfactant may be in a range of 1,000 parts by weight to about 100,000 parts by weight, based on 100 parts by weight of the conductive carbon.

In the composite including the conductive carbon and the mesoporous silica prepared according to the method described above, amounts of the conductive carbon may be in a range of about 1 part by weight to about 10 parts by weight, based on 100 parts by weight of the composite. When the composite has such a range of the conductive carbon, the conductive carbon may be uniformly dispersed in the mesoporous silica, and accordingly the composite may have excellent conductivity improvement effect.

Hereinafter, one or more embodiments will be described in more detail with reference to the following examples. These examples shall not limit the scope of this disclosure.

EXAMPLES

Comparative Preparation Example 1: Preparation of Activated CNT 75 milliliters (mL) of sulfuric acid (95 wt %, Samchun) was added to 0.5 grams (g) of CM250 (Hanwha nanotech), followed by sonification for 12 hours. Next, the resultant was filtered and washed out with distilled water to obtain activated multi-walled nanotube ("MWNT").

Comparative Preparation Example 2: Preparation of Activated Graphene

First, 10 g of 1-butanol was mixed with 300 g of water, and 25 g of graphene (XG science) was added thereto. Next, 150 g of nitric acid (60 wt %, Samchun) and 50 g of sulfuric acid (95 wt %, Samchun) were added and mixed with the mixture. The mixture was continuously stirred while 100 ml of $H_2O_2$ was added thereto. 10 g of $KMnO_4$ and 10 g of water were added to the stirred mixture in an ice bath, and were continuously stirred again.

The stirred mixture was then refluxed at a temperature of 130° C. for 40 hours in an oil bath.

The resultant was filtered and washed out to obtain activated graphene.

Comparative Preparation Example 3: Preparation of Mesoporous $SiO_2$ 30 g of surfactant (Pluronic 123, Aldrich) and 30 g of 1-butanol (99.5 wt %, Samchun) were dissolved in 1,085 g of water, and the mixture was continuously stirred while 59 g of hydrochloric acid solution (35 wt %) was added thereto.

The mixture was continuously stirred until a temperature of the mixture was adjusted to 35° C. Next, 66.5 g of tetraethyl orthosilicate ("TEOS") (95 wt %, Aldrich) was added to the mixture, and then stirred at a temperature of 35° C. for 24 hours.

A hydrothermal treatment of the mixture was performed at a temperature of 100° C. for 24 hours.

The mixture was then filtered, washed with ethanol, and filtered again.

The resultant was heat treated at a temperature of 370° C. for 3 hours to obtain mesoporous $SiO_2$ (KIT-6, a molecular sieve in which three dimensional pores are connected to each other).

Preparation Example 1: Preparation of a Composite Including CNT and Mesoporous $SiO_2$ (KIT-6)

30 g of surfactant (Pluronic 123, Aldrich) was dissolved in 1,085 g of water, and 0.183 g of the activated MWNT of Comparative Preparation Example 1 was added thereto, followed by sonication for 12 hours.

30 g of 1-butanol (99.5 wt %, Samchun) was added to the mixture at room temperature, and 59 g of a hydrochloric acid solution (35 wt %) was further added thereto, and continuously stirred. Next, 66.5 g of TEOS (95 wt %, Aldrich) was added to the mixture, and then stirred again at a temperature of 35° C. for 24 hours.

A hydrothermal treatment of the mixture was performed at a temperature of 100° C. for 24 hours.

The reaction mixture was then filtered, washed with ethanol, and filtered again.

The resultant was heat treated at a temperature of 370° C. for 3 hours to obtain a composite including CNT and mesoporous $SiO_2$ (KIT-6).

In the composite, the amount of the CNT was 1 parts by weight based on 100 parts by weight of the composite including CNT and mesoporous $SiO_2$ (KIT-6).

Preparation Example 2: Preparation of a Composite Including CNT and Mesoporous $SiO_2$ (KIT-6)

A composite including CNT and mesoporous $SiO_2$ (KIT-6) was prepared in the same manner as in Preparation Example 1, except that 0.563 g of MWNT was used instead of 0.183 g of MWNT.

In the composite, the amount of the CNT was 3 parts by weight based on 100 parts by weight of the composite including CNT and mesoporous $SiO_2$ (KIT-6).

Preparation Example 3: Preparation of a Composite Including CNT and Mesoporous $SiO_2$ (KIT-6)

A composite including CNT and mesoporous $SiO_2$ (KIT-6) was prepared in the same manner as in Preparation Example 1, except that 0.958 g of MWNT was used instead of 0.183 g of MWNT.

In the composite, the amount of the CNT was 5 parts by weight based on 100 parts by weight of the composite including CNT-mesoporous $SiO_2$ (KIT-6).

Preparation Example 4: Preparation of a Composite Including CNT and Mesoporous $SiO_2$ (KIT-6)

A composite including CNT-mesoporous $SiO_2$ (KIT-6) was prepared in the same manner as in Preparation Example 1, except that 1.916 g of MWNT was used instead of 0.183 g of MWNT.

In the composite, the amount of the CNT was 10 parts by weight based on 100 parts by weight of the composite including CNT-mesoporous $SiO_2$ (KIT-6).

Preparation Example 5: Preparation of a Composite Including Graphene and Mesoporous $SiO_2$ (KIT-6)

30 g of surfactant Pluronic 123 (Aldrich) was dissolved in 1,085 g of water, and 0.183 g of the activated graphene of Comparative Preparation Example 2 was added thereto, followed by sonication for 12 hours.

30 g of 1-butanol (99.5 wt %, Samchun) was added to the mixture at room temperature, and 59 g of a hydrochloric acid solution (35 wt %) was further added thereto, and continuously stirred. Next, 66.5 g of TEOS (95 wt %, Aldrich) was added to the mixture, and then first-heat treated at a temperature of 35° C. for 24 hours.

A hydrothermal treatment of the reaction mixture was performed at a temperature of 100° C. for 24 hours. This process was the second heat treatment.

The reaction mixture was then filtered, washed with ethanol, and filtered again.

The resultant was heat treated at a temperature of 370° C. for 3 hours to obtain a composite including graphene and mesoporous $SiO_2$ (KIT-6).

In the composite, the amount of the graphene was 1 parts by weight based on 100 parts by weight of the composite including graphene and mesoporous $SiO_2$ (KIT-6).

Preparation Example 6: Preparation of a Composite Including Graphene and Mesoporous $SiO_2$ (KIT-6)

A composite including graphene and mesoporous $SiO_2$ (KIT-6) was prepared in the same manner as in Preparation Example 1, except that 0.563 g of graphene was used instead of 0.183 g of graphene.

The amount of the graphene was 3 parts by weight based on 100 parts by weight of the composite including graphene and mesoporous $SiO_2$ (KIT-6).

Preparation Example 7: Preparation of a Composite Including Graphene and Mesoporous $SiO_2$ (KIT-6)

A composite including graphene and mesoporous $SiO_2$ (KIT-6) was prepared in the same manner as in Preparation Example 1, except that 0.958 g of graphene was used instead of 0.183 g of graphene.

In the composite, the amount of the graphene was 5 parts by weight based on 100 parts by weight of the composite including graphene and mesoporous $SiO_2$ (KIT-6).

Example 1: Preparation of Electrode Active Material (a Composite Including CNT and Mesoporous $Mn_3O_4$)

A $Mn(NO_3)_2 \cdot H_2O$ aqueous solution was heated and the resulting product was injected into the composite including the CNT and mesoporous $SiO_2$ (KIT-6) of Preparation Example 1. Here, the resulting product obtained by heating $Mn(NO_3)_2 \cdot H_2O$ aqueous solution was injected into the composite including the CNT and mesoporous $SiO_2$ (KIT-6) in a way that the amount of $Mn_3O_4$ was 40 parts by weight based on 100 parts by weight of the mesoporous $SiO_2$ (KIT-6).

Next, the resultant was first-heat treated in an $N_2$ atmosphere at a temperature of 550° C. for 3 hours. Then, a second-heating was performed thereon in an $H_2$ atmosphere at a temperature of 300° C. for 3 hours, thereby forming a composite including CNT, mesoporous $SiO_2$, and $Mn_3O_4$.

The composite including CNT, mesoporous $SiO_2$, and $Mn_3O_4$ was added to a 2M NaOH aqueous solution and reacted for 10 minutes, and this adding and reacting process was performed again to remove the $SiO_2$ template from the composite, followed by filtering. As a result, an electrode active material, i.e., a composite including CNT and mesoporous $Mn_3O_4$ was obtained.

The amount of the CNT was about 1 parts by weight based on 100 parts by weight of the electrode active material (i.e., composite including CNT and mesoporous $Mn_3O_4$).

Examples 2 to 4: Preparation of Electrode Active Material (a Composite Including CNT and Mesoporous $Mn_3O_4$)

A composite including CNT and mesoporous $Mn_3O_4$ was prepared in the same manner as in Example 1, except that the composite including CNT and mesoporous $SiO_2$ of Manufacturing Examples 2 to 4 was used instead of the composite including CNT and mesoporous $SiO_2$ of Preparation Example 1.

The amounts of the CNT in the electrode active material prepared in Examples 2 to 4 were about 3, 5, and 10 parts by weight, respectively, based on 100 parts by weight of the electrode active material (i.e., the composite including CNT and mesoporous $Mn_3O_4$), respectively.

Examples 5 to 7: Preparation of Electrode Active Material (a Composite Including Graphene and Mesoporous $Mn_3O_4$)

An electrode active material (i.e., a composite including graphene and mesoporous $Mn_3O_4$) was prepared in the same manner as in Example 1, except that the composite including graphene and mesoporous $SiO_2$ of Manufacturing Examples 5 to 7 was used instead of the composite including graphene and mesoporous $SiO_2$ of Preparation Example 1.

The amounts of the graphene in the electrode active material prepared in Examples 5 to 7 were about 1, 3, and 5 parts by weight, respectively, based on 100 parts by weight of the electrode active material (i.e., composite), respectively.

Comparative Example 1: Preparation of Mesoporous $Mn_3O_4$

A $Mn(NO_3)_2 \cdot H_2O$ aqueous solution was heated and the resulting product was injected into the mesoporous $SiO_2$ (KIT-6) of Comparative Preparation Example 3. Here, the resulting product obtained by heating the $Mn(NO_3)_2 \cdot H_2O$ aqueous solution was injected into the mesoporous $SiO_2$ (KIT-6) so that the amount of $Mn_3O_4$ was 40 parts by weight, based on 100 parts by weight of the mesoporous $SiO_2$ (KIT-6).

Next, the resultant was first-heat treated in an $N_2$ atmosphere at a temperature of 550° C. for 3 hours. Then, a second-heating was performed thereon in an $H_2$ atmosphere at a temperature of 300° C. for 3 hours.

The heated resultant was added to a 2 molar (M) NaOH aqueous solution and reacted for 10 minutes, and this adding and reacting process was performed again to remove the $SiO_2$ template, followed by filtering. As a result, mesoporous $Mn_3O_4$ was obtained.

Evaluation Example 1: Scanning Electron Microscope ("SEM") Analysis

1) Manufacturing Examples 1 to 3 and Comparative Preparation Example 3

Figure 4A:
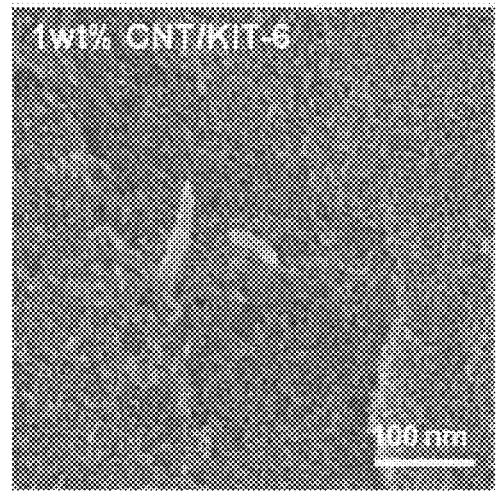
FIGS. 4A and 4B are scanning electron microscope ("SEM") images of a composite including carbon nanotube ("CNT") and mesoporous $SiO_2$ prepared according to Preparation Example 1.
Figure 4B:
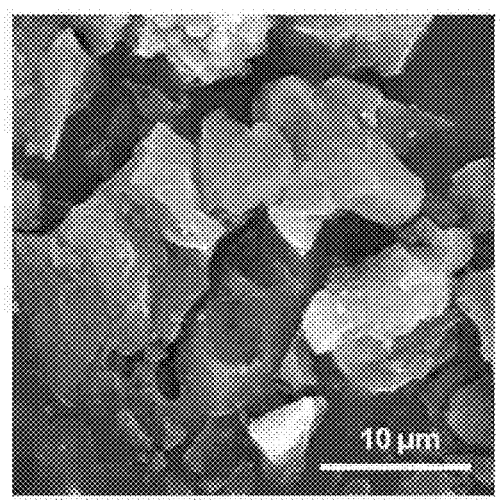
Figure 5A:
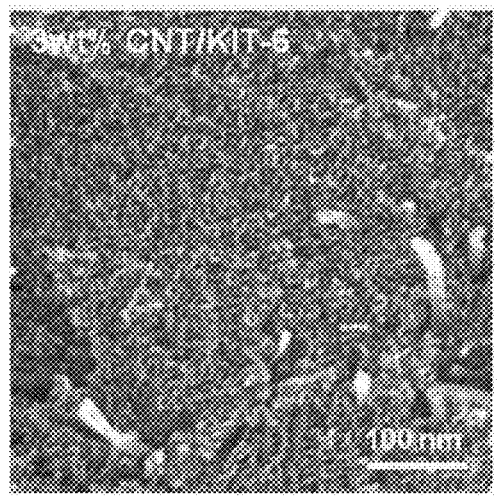
FIGS. 5A and 5B are SEM images of a composite including CNT and mesoporous $SiO_2$ prepared according to Preparation Example 2.
Figure 5B:
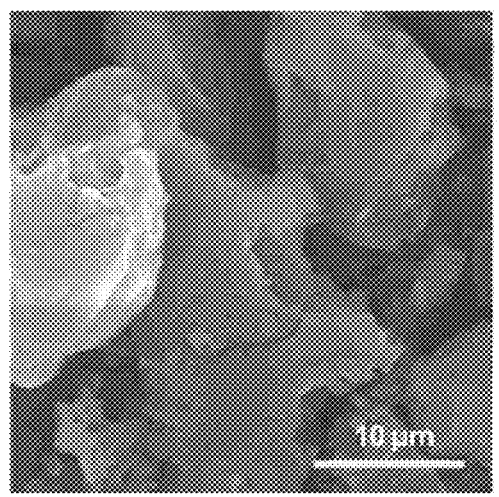
Figure 6A:
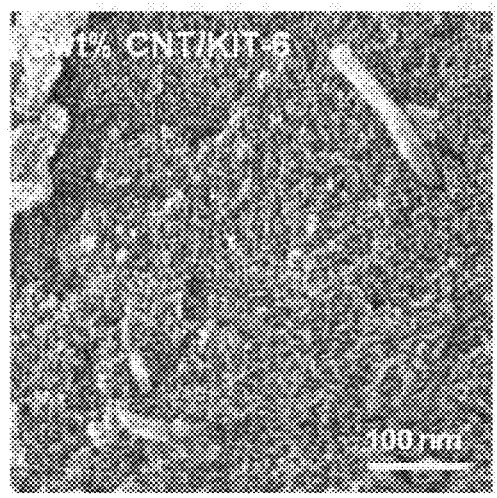
FIGS. 6A and 6B are SEM images of a composite including CNT and mesoporous $SiO_2$ prepared according to Preparation Example 3.
Figure 6B:
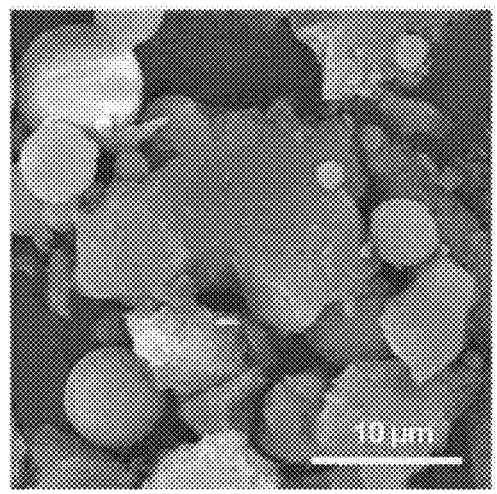
Figure 7A:
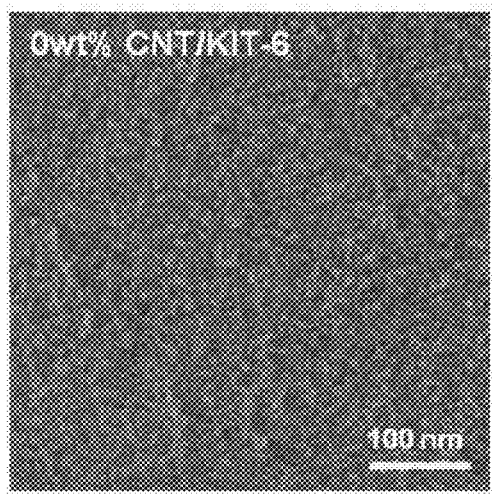
FIGS. 7A and 7B are SEM images of mesoporous $SiO_2$ (KIT-6) prepared according to Comparative Preparation Example 3.
Figure 7B:
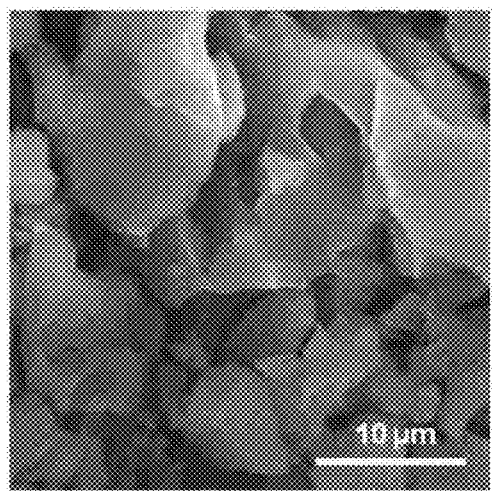

The mesoporous $SiO_2$ (KIT-6) of Comparative Example 3 and the composites including CNT and mesoporous $SiO_2$ of Manufacturing Examples 1 to 3 were analyzed by using a scanning electron microscopy ("SEM"), and results thereof are shown in FIGS. 4A and 4B (Preparation Example 1), FIGS. 5A and 5B (Preparation Example 2), FIGS. 6A and 6B (Preparation Example 3), and FIGS. 7A and 7B (KIT-6). Here, FIGS. 4B, 5B, 6B, and 7B are low-magnification SEM images of FIGS. 4A, 5A, 6A, and 7A, respectively.

Referring to FIGS. 4 to 7, it was confirmed that the composites of Manufacturing Examples 1 to 3 have ordered mesoporous structures in which CNT is embedded.

2) Examples 1 to 3 and Comparative Example 1

Figure 8A:
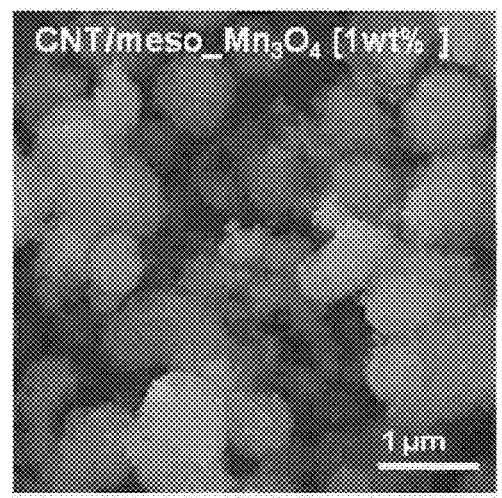
FIGS. 8A and 8B are SEM images of an electrode active material prepared according to Example 1.
Figure 8B:
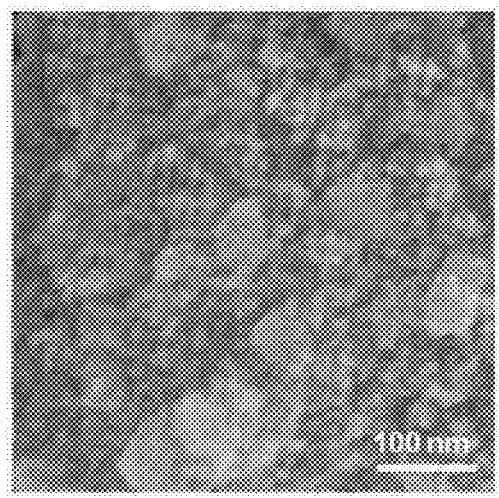
Figure 9A:
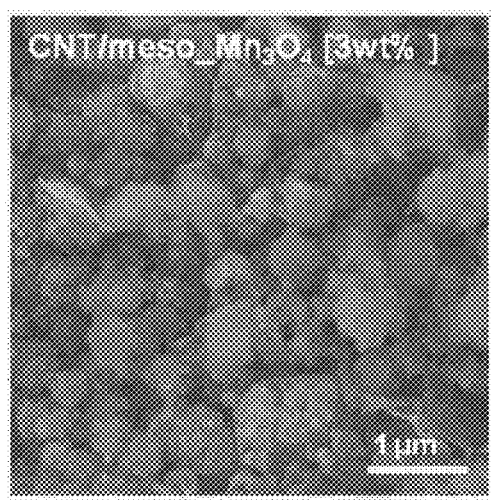
FIGS. 9A and 9B are SEM images of an electrode active material prepared according to Example 2.
Figure 9B:
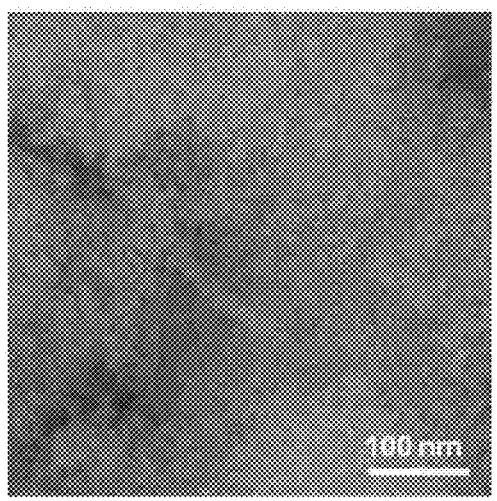
Figure 10A:
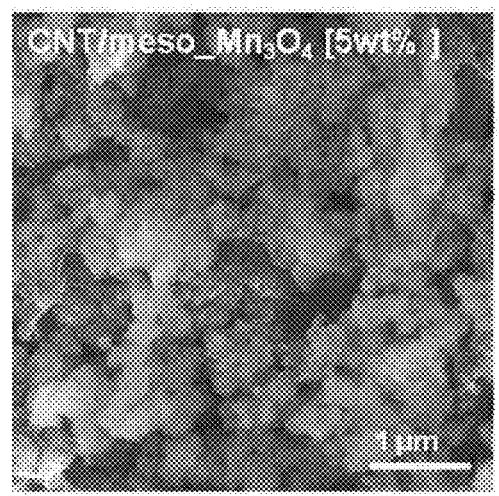
FIGS. 10A and 10B are SEM images of an electrode active material prepared according to Example 3.
Figure 10B:
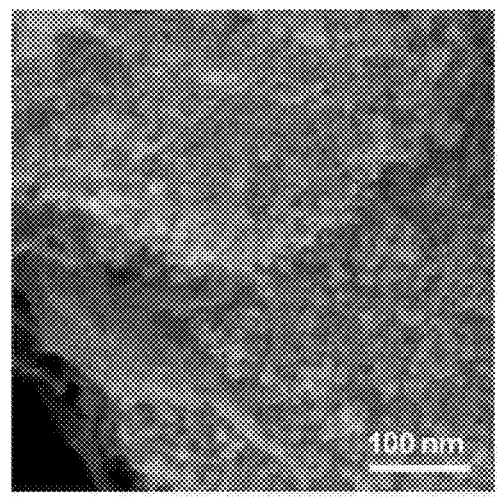
Figure 11A:
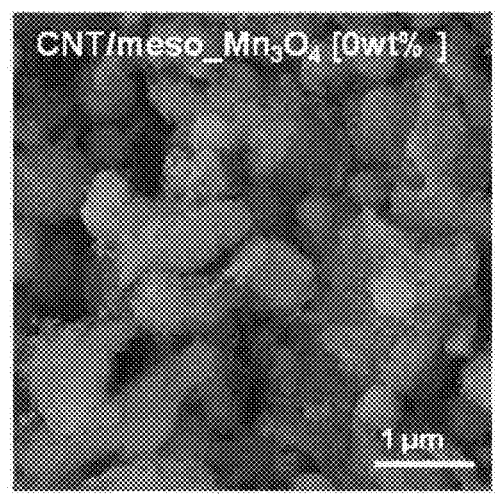
FIGS. 11A and 11B are SEM images of mesoporous $Mn_3O_4$ prepared according to Comparative Example 1.
Figure 11B:
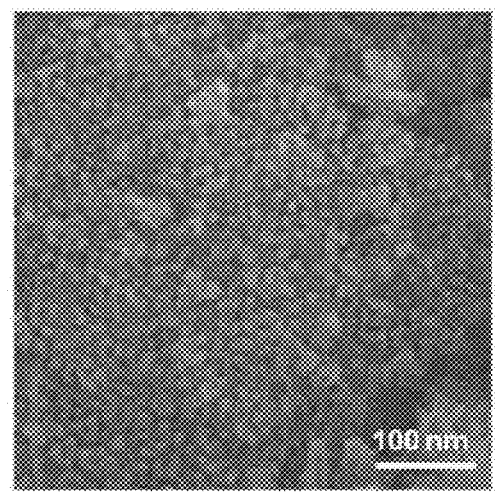

The mesoporous $Mn_3O_4$ of Comparative Example 1 and the composites including CNT and mesoporous $Mn_3O_4$ of Examples 1 to 3 were analyzed by using an SEM, and results thereof are shown in FIGS. 8A and 8B (Example 1), FIGS. 9A and 9B (Example 2), FIGS. 10A and 10B (Example 3), and FIGS. 11A and 11B (KIT-6). Here, FIGS. 8B, 9B, 10B, and 11B are high-magnification SEM images of FIGS. 8A, 9A, 10A, and 11A, respectively.

Referring to FIGS. 8 to 11, it was confirmed that the composites of Examples 1 to 3 have ordered mesoporous structures in which CNT is embedded.

3) Comparative Preparation Example 3 and Manufacturing Examples 5 to 7

Figure 12A:
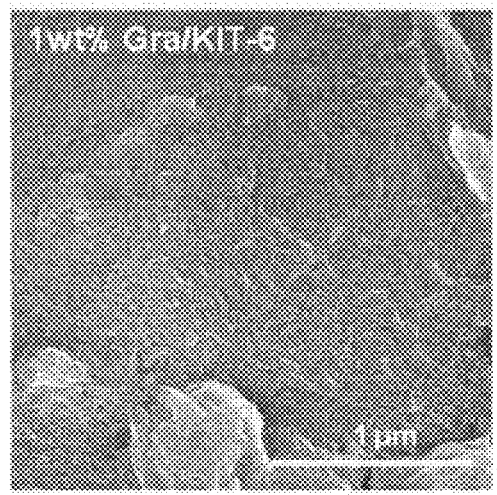
FIGS. 12A and 12B are SEM images of a composite including graphene and mesoporous $SiO_2$ prepared according to Preparation Example 5.
Figure 12B:
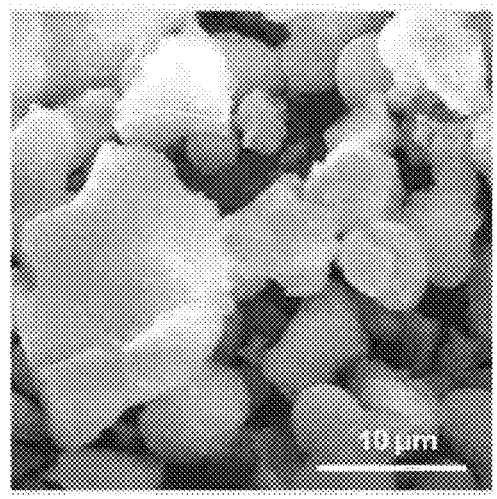
Figure 13A:
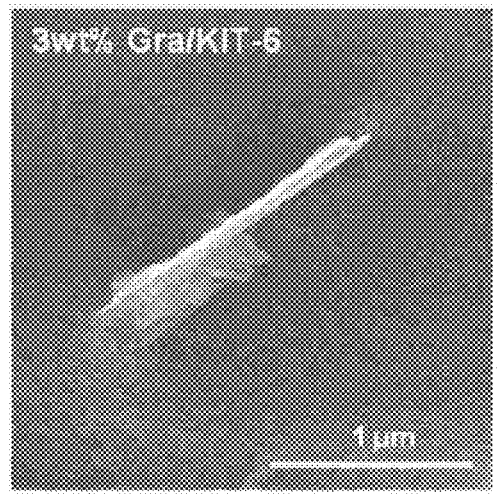
FIGS. 13A and 13B are SEM images of a composite including graphene and mesoporous $SiO_2$ prepared according to Preparation Example 6.
Figure 13B:
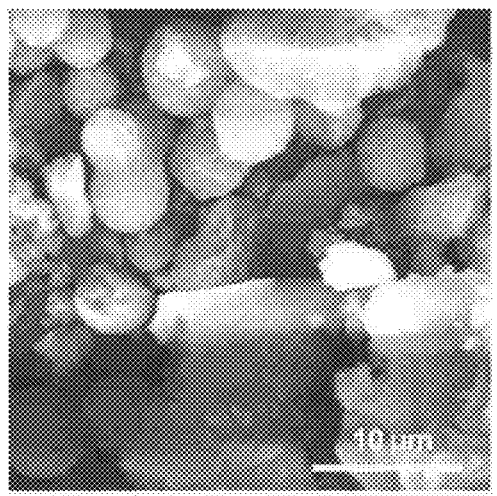
Figure 14A:
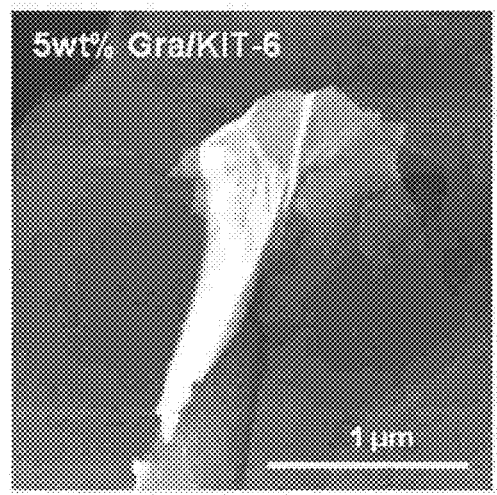
FIGS. 14A and 14B are SEM images of a composite including graphene and mesoporous $SiO_2$ prepared according to Preparation Example 7.
Figure 14B:
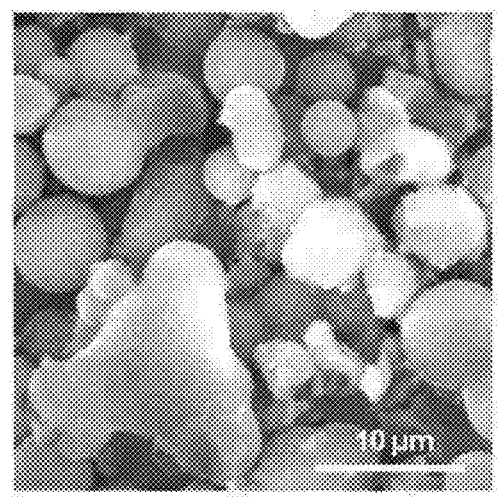

The mesoporous silica (KIT-6) composite of Comparative Preparation Example 3 and the composites including CNT and mesoporous $SiO_2$ of Manufacturing Examples 5 to 7 were analyzed by using an SEM, and results thereof are shown in FIGS. 7A and 7B (KIT-6), FIGS. 12A and 12B (Preparation Example 5), FIGS. 13A and 13B (Preparation Example 6), and FIGS. 14A and 14B (Preparation Example 7). Here, FIGS. 7B, 12B, 13B, and 14B are high-magnification SEM images of FIGS. 7A, 12A, 13A, and 14A, respectively.

Referring to FIGS. 7 and 12 to 14, it was confirmed that the composites of Manufacturing Examples 5 to 7 have three dimensional mesoporous structures with highly orderly arranged mesopores.

Figure 15A:
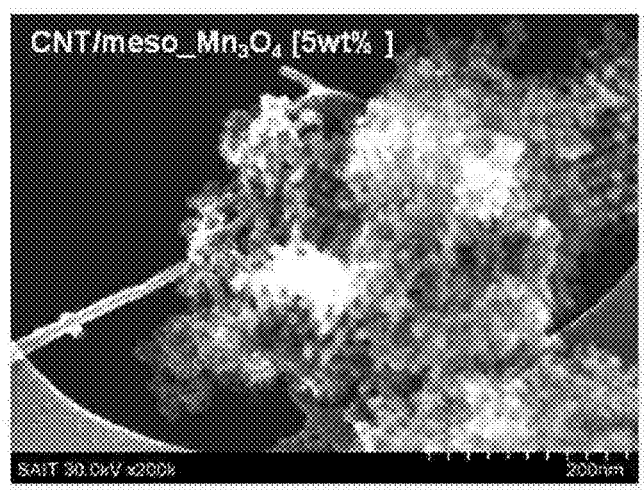
FIGS. 15A and 15B are scanning transmission electron microscope ("STEM") images of the composite including CNT and mesoporous $Mn_3O_4$ of Example 3.
Figure 15B:

Evaluation Example 2: Scanning Transmission Electron Microscope ("STEM") Analysis The composite including CNT and mesoporous $Mn_3O_4$ of Example 3 was analyzed by using a scanning transmission electron microscope ("STEM"), and results thereof are shown in FIGS. 15A and 15B. An analyzer S-5500 manufactured by Hitachi Company was used for the STEM analysis. FIG. 15A is an SEM image and FIG. 15B is an STEM image.

Referring to FIG. 15, it was confirmed that the electrode active material of Example 3 have the CNT that is penetrated through or inserted into the mesoporous $Mn_3O_4$.

Evaluation Example 3: X-Ray Diffraction Analysis

1) Manufacturing Examples 1 to 4 and Comparative Preparation Example 3

Figure 16A:
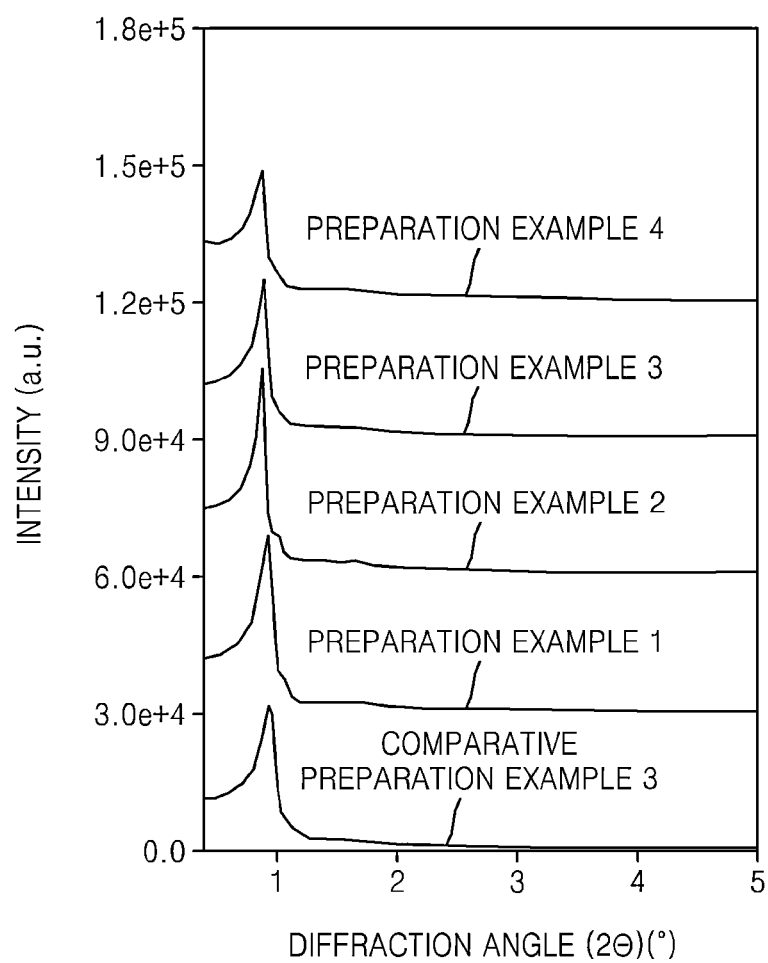
FIG. 16A is a graph of intensity (arbitrary units) versus diffraction angle (degrees two-theta, $2\theta$) showing the results of low angle X-ray diffraction analysis using CuK$\alpha$ radiation on the mesoporous $SiO_2$ (KIT-6) of Comparative Preparation Example 3 and the composites including CNT and mesoporous $SiO_2$ (KIT-6) of Manufacturing Examples 1 to 4.

X-ray diffraction analysis was performed using CuKα radiation on the mesoporous $SiO_2$ (KIT-6) of Comparative Preparation Example 3 and the composites including CNT and mesoporous $SiO_2$ (KIT-6) of Manufacturing Examples 1 to 4, and low angle diffraction patterns of the active materials are shown in FIG. 16A. The X-ray diffraction analysis was performed by using a Rigaku RINT2200HF+ diffractometer using Cu Kα radiation (1.540598 Å).

Referring to FIG. 16A, peaks of the composites including CNT and mesoporous $SiO_2$ (KIT-6) with respect to a (210) plane appear at a Bragg 2θ angle between 0.9° and 1.0°. The (210) plane corresponds to a plane of a highly ordered three dimensional framework and pore structure in the mesoporous $SiO_2$ (KIT-6). The low angle X-ray diffraction spectrum is a diffraction pattern formed by the ordered arrangement of the nano-sized framework and pore structure.

2) Examples 1 to 4 and Comparative Example 1

Figure 16B:
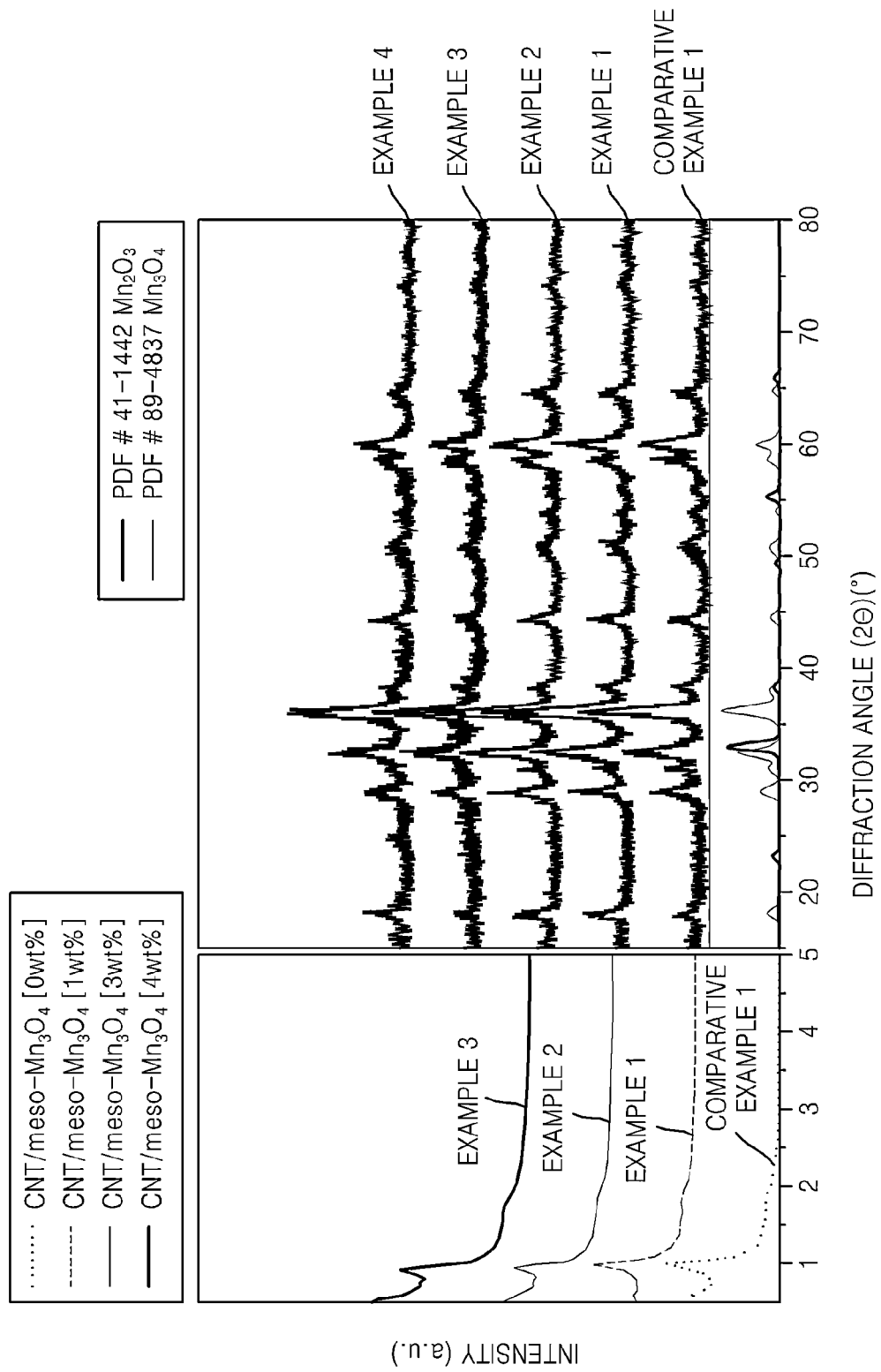
FIG. 16B is a graph of intensity (arbitrary units) versus diffraction angle (degrees two-theta, $2\theta$) showing the results of low angle and high angle X-ray diffraction analysis using CuK$\alpha$ radiation on the mesoporous $Mn_3O_4$ of Comparative Example 1 and the electrode active materials of Examples 1 to 4.

X-ray diffraction analysis was performed using CuKα on the mesoporous $Mn_3O_4$ of Comparative Example 1 and the electrode active materials of Manufacturing Examples 1 to 4, and low angle diffraction patterns and high angle diffraction patterns of the active materials are shown in FIG. 16B. For comparison, FIG. 16B also illustrates diffraction patterns of mesoporous $Mn_2O_3$ and mesoporous $Mn_3O_4$. The X-ray diffraction analysis was performed by using a Rigaku RINT2200HF+ diffractometer using Cu Kα radiation (1.540598 Å)

Referring to FIG. 16B, peaks of the electrode active materials with respect to a (210) plane appear at a Bragg 2θ angle between 0.9° and 1.0°. The (210) plane corresponds to a plane of a highly ordered three dimensional framework and pore structure in the mesoporous $Mn_3O_4$. The low angle X-ray diffraction spectrum is a diffraction pattern formed by the ordered arrangement of the nano-sized framework and pore structure. In addition, it was confirmed that the electrode active materials of Examples 1 to 3 have mesoporous structures as in the case of Comparative Example 1.

3) Manufacturing Examples 5 to 7 and Comparative Preparation Example 3

Figure 16C:
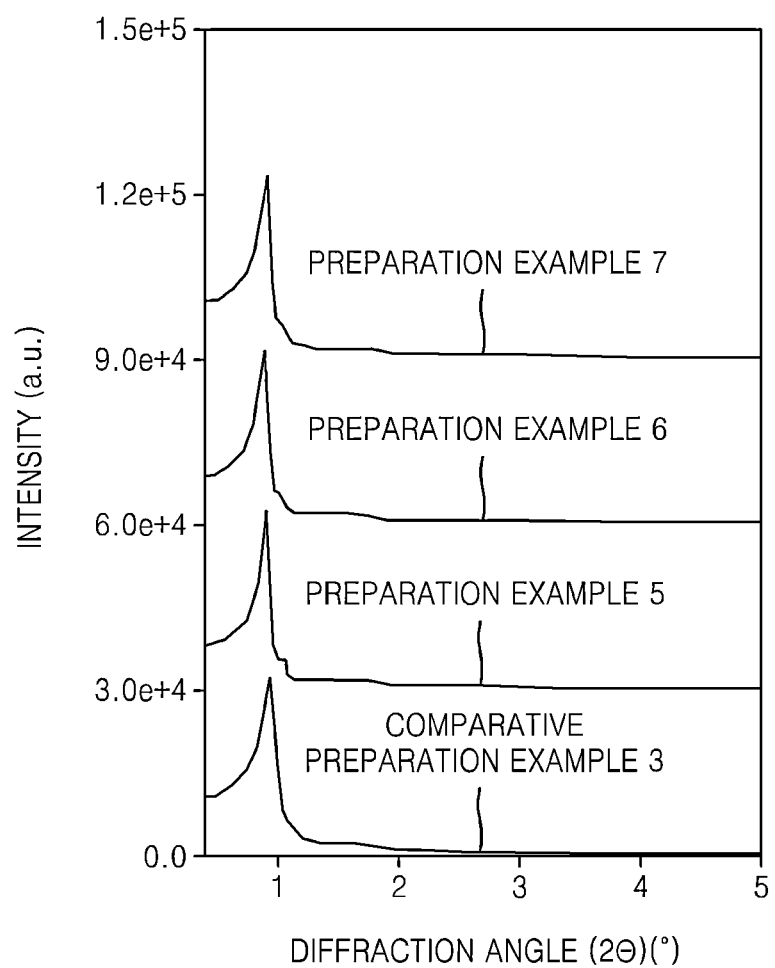
FIG. 16C is a graph of intensity (arbitrary units) versus diffraction angle (degrees two-theta, $2\theta$) showing the results of low angle X-ray diffraction analysis using CuK$\alpha$ radiation on the mesoporous $SiO_2$ (KIT-6) of Comparative Preparation Example 3 and the composites including graphene and mesoporous $SiO_2$ (KIT-6) of Manufacturing Examples 5 to 7.

An X-ray diffraction analysis was performed using CuKα radiation on the mesoporous $SiO_2$ (KIT-6) of Comparative Preparation Example 3 and the composites including graphene and mesoporous $SiO_2$ (KIT-6) of Manufacturing Examples 5 to 7, and low angle diffraction patterns of the active materials are shown in FIG. 16C.

Referring to FIG. 16C, peaks of the composites including graphene and mesoporous $SiO_2$ (KIT-6) with respect to a (210) plane appear at a Bragg 2θ angle between 0.9° and 1.0°. The (210) plane corresponds to a plane of a highly ordered three dimensional framework and pore structure in the mesoporous $SiO_2$ (KIT-6). The low angle X-ray diffraction spectrum is a diffraction pattern formed by the ordered arrangement of the nano-sized framework and pore structure.

4) Comparative Example 1 and Examples 5 to 7

Figure 16D:
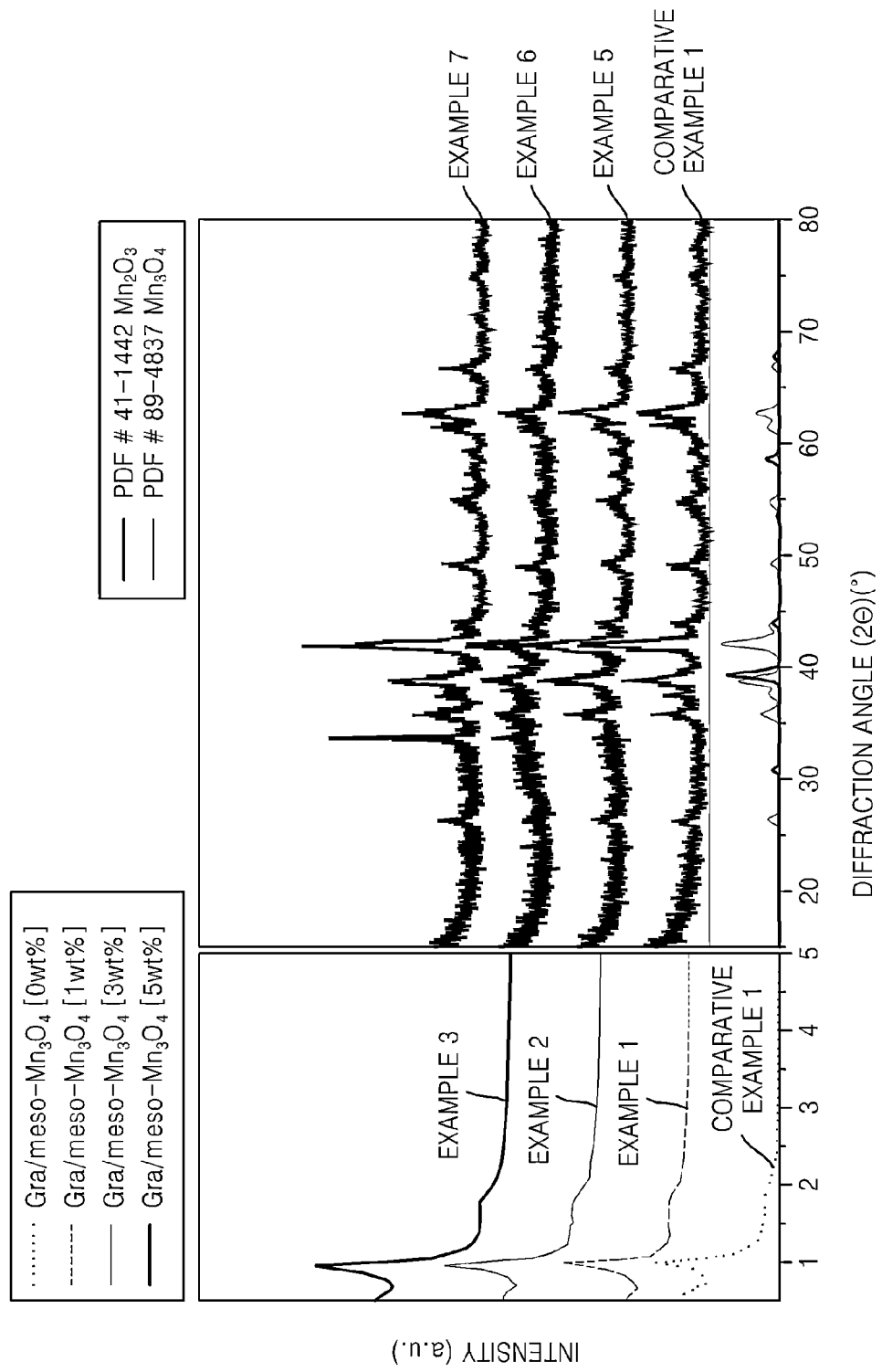
FIG. 16D is a graph of intensity (arbitrary units) versus diffraction angle (degrees two-theta, 2θ) showing the results of low angle and high angle X-ray diffraction analysis using CuKα on the mesoporous $Mn_3O_4$ of Comparative Example 1 and the electrode active materials of Manufacturing Examples 5 to 7.

An X-ray diffraction analysis was performed using CuKα radiation on the mesoporous $Mn_3O_4$ of Comparative Example 1 and the electrode active materials of Examples 5 to 7, and low angle diffraction patterns and high angle diffraction patterns of the active materials are shown in FIG. 16D. For comparison, FIG. 16D also illustrates diffraction patterns of mesoporous $Mn_2O_3$ and mesoporous $Mn_3O_4$.

Referring to FIG. 16D, peaks of the electrode active materials of Examples 5 to 7 with respect to a (210) plane appear at a Bragg 2θ angle between 0.9° and 1.0°. The (210) plane corresponds to a plane of a highly ordered three dimensional framework and pore structure in the mesoporous $Mn_3O_4$. The low angle X-ray diffraction spectrum is a diffraction pattern formed by the ordered arrangement of the nano-sized framework and pore structure. In addition, it was confirmed that the electrode active materials of Examples 5 to 7 have mesoporous structures as in the case of Comparative Example 1.

Evaluation Example 4: Nitrogen Adsorption Analysis

1) Preparation Examples 1 to 4 and Comparative Preparation Example 3

A nitrogen adsorption analysis was performed on the active material of Preparation Examples 1 to 4 and the mesoporous $SiO_2$ of Comparative Preparation Example 3.

In the nitrogen adsorption analysis, nitrogen was adsorbed to or desorbed from the each powder of the active material of Preparation Examples 1 to 4 and the mesoporous $SiO_2$ of Comparative Preparation Example 3, and from the difference between the amount of the adsorbed nitrogen and the amount of the desorbed nitrogen, a specific surface area, a pore volume, and a pore size distribution of the each powder was obtained. In detail, from an $N_2$ adsorption-desorption isotherm which was obtained by nitrogen adsorption, the specific surface area of a pore was calculated using a Brunauer-Emmett-Teller ("BET") method, the whole volume of the pore was directly deduced from the Y axis of the $N_2$ adsorption-desorption graph, and the pore size distribution was obtained using the Barrett-Joyner-Halenda ("BJH") method. The results thereof are shown in Table 1 below and FIGS. 17A and 18A (the active materials of Preparation Examples 1 to 4 and the mesoporous $SiO_2$ of Comparative Preparation Example 3):

TABLE 1

|  | Specific surface area ($m^2/g$) | Total pore volume (mL/g) | Average diameter of mesopore (nm) | Density Vt ($cm^3/g$) |
|---|---|---|---|---|
| Comparative Preparation Example 3 | 922 | 1.06 | 6.9 | 1.06 |
| Preparation Example 1 | 897 | 1.10 | 7.8 | 1.10 |
| Preparation Example 2 | 1010 | 1.47 | 9.3 | 1.47 |
| Preparation Example 3 | 989 | 1.27 | 8.7 | 1.27 |
| Preparation Example 4 | 986 | 1.30 | 9.6 | 1.30 |

Figure 17A:
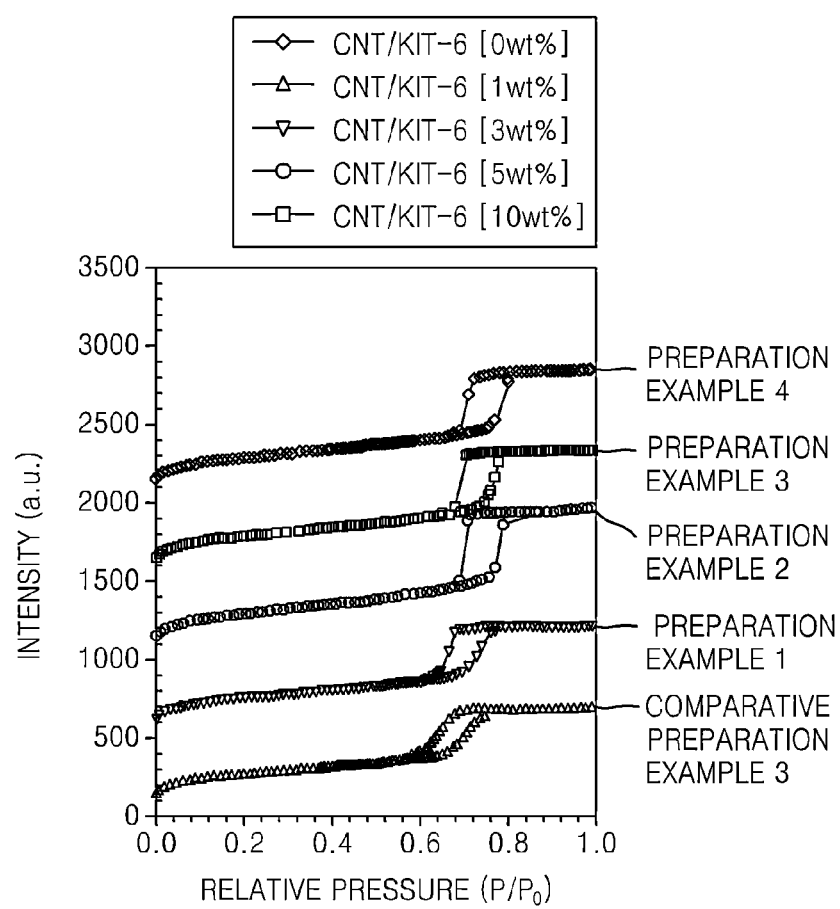
FIG. 17A is a graph of intensity (arbitrary units) versus relative pressure (P/$P_o$) and FIG. 18A is a graph of intensity versus pore diameter (nanometers) showing the results of nitrogen adsorption analysis of the composites including CNT and mesoporous $SiO_2$ of Manufacturing Examples 1 to 4 and the mesoporous $SiO_2$ of Comparative Preparation Example 3.
Figure 18A:
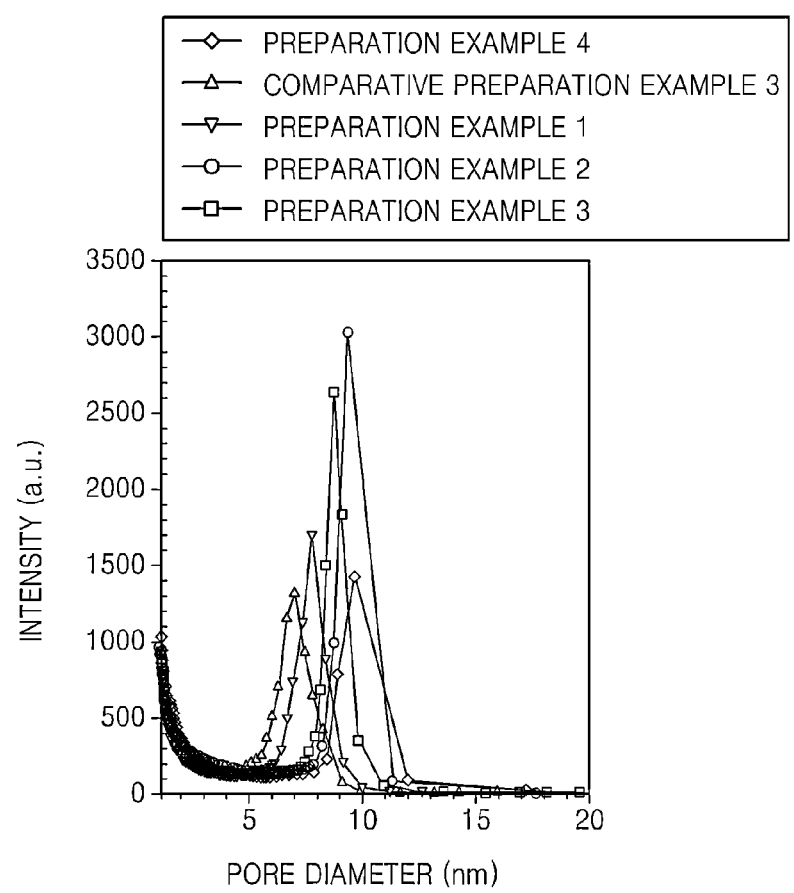

Referring to Table 1 above and FIGS. 17A and 18A, a simple blend of the CNT and the mesoporous $SiO_2$ showed double hysteresis characteristics representing all the characteristics of the CNT and the mesoporous $SiO_2$. However, the composites of Preparation Examples 1 to 4 did not show double hysteresis characteristics. The double hysteresis is understood to appear because of the CNT and the mesoporous $SiO_2$ have different phases in the $N_2$ adsorption-desorption graph.

In this regard, it was confirmed that the composites of Preparation Examples 1 to 4 have three dimensional mesoporous structures with orderly arranged mesopores.

2) Examples 1 to 4 and Comparative Example 1

Nitrogen adsorption analysis was performed on the composites of Examples 1 to 4 and the mesoporous $Mn_3O_4$ of Comparative Example 1.

In the nitrogen adsorption test, nitrogen was adsorbed to or desorbed from the respective powder of the composites of Examples 1 to 4 and the mesoporous $Mn_3O_4$ of Comparative Example 1, and from the difference between the amount of the adsorbed nitrogen and the amount of the desorbed nitrogen, a specific surface area, a pore volume, and a pore size distribution of each respective powder was obtained. In detail, from an $N_2$ adsorption-desorption isotherm, which was obtained by nitrogen adsorption analysis, the specific surface area of the pores was calculated by using a Brunauer-Emmett-Teller ("BET") method, the total pore volume was directly deduced from the Y axis of the $N_2$ adsorption-desorption graph, and the pore size distribution was obtained by using the Barrett-Joyner-Halenda ("BJH") method. The results thereof are shown in Table 2 below and FIGS. 17B and 18B for the active materials of Examples 1 to 4 and the mesoporous $Mn_3O_4$ of Comparative Example 1:

TABLE 2

| | Specific surface area ($m^2/g$) | Total pore volume (mL/g) | Average diameter of mesopore (nm) |
|---|---|---|---|
| Comparative Example 1 | 109 | 0.21 | 3.2 |
| Example 1 | 116 | 0.24 | 3.1 |
| Example 2 | 114 | 030 | 2.9 |
| Example 3 | 133 | 0.30 | 2.4 |
| Example 4 | 150 | 0.45 | 2.2 |

Figure 17B:
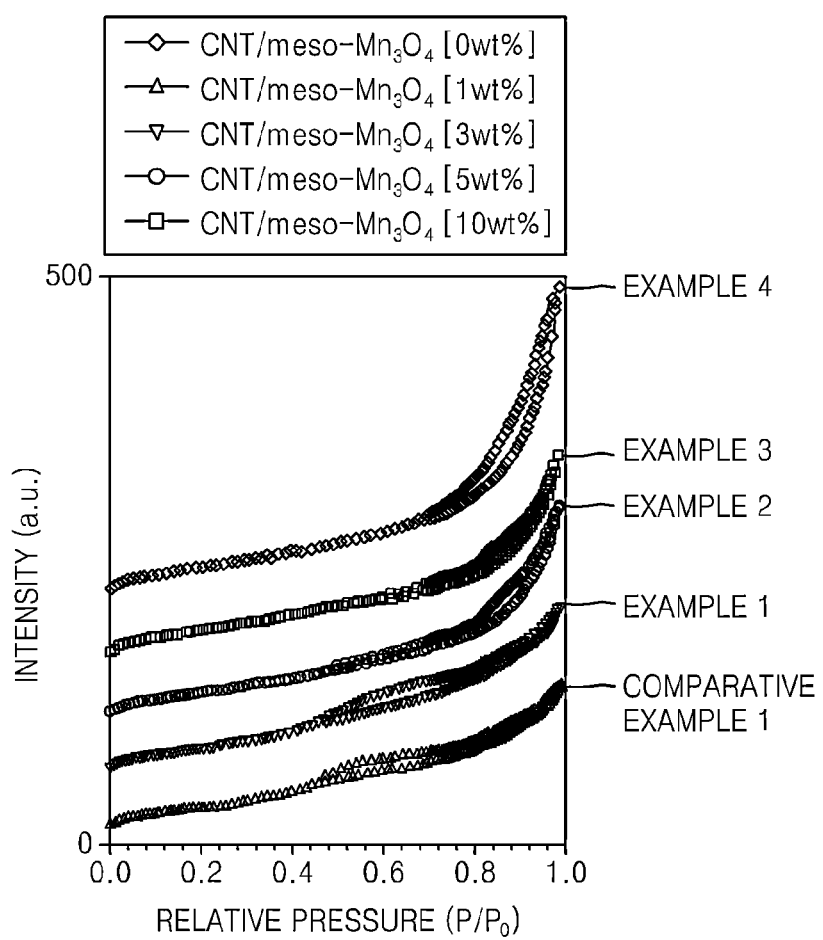
FIG. 17B is a graph of intensity (arbitrary units) versus relative pressure (P/$P_o$) and FIG. 18B is a graph of intensity versus pore diameter (nanometers) showing the results of nitrogen adsorption analysis of the composites of Examples 1 to 4 and the mesoporous $Mn_3O_4$ of Comparative Example 1, instead of the active materials of Manufacturing Examples 1 to 4 and the mesoporous $SiO_2$ of Comparative Preparation Example 3.
Figure 18B:
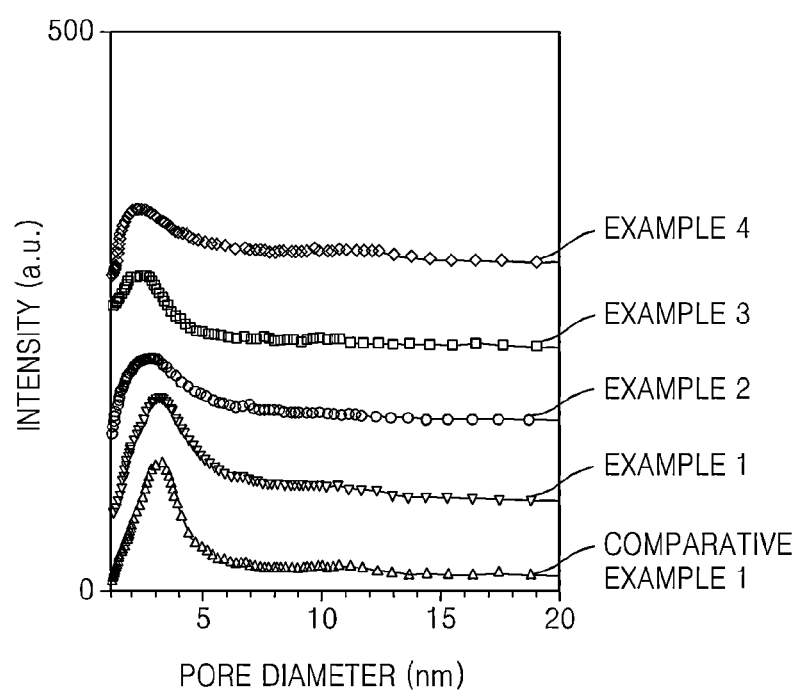

Referring to Table 2 above and FIGS. 17B and 18B, a simple blend of the CNT and the mesoporous $Mn_3O_4$ showed double hysteresis characteristics representing all the characteristics of the CNT and the mesoporous $Mn_3O_4$. However, the electrode active materials of Examples 1 to 4 did not show double hysteresis characteristics. In this regard, it was confirmed that the composites of Examples 1 to 4 have three dimensional mesoporous structures with orderly arranged mesopores.

3) Examples 5 to 7 and Comparative Preparation Example 3

Nitrogen adsorption analysis was performed on the composites of Preparation Examples 5 to 7 and the mesoporous $SiO_2$ of Comparative Preparation Example 3.

In the nitrogen adsorption analysis, nitrogen was adsorbed to or desorbed from each respective powder, and from the difference between the amount of the adsorbed nitrogen and the amount of the desorbed nitrogen, a specific surface area, a pore volume, and a pore size distribution were obtained. In detail, from an $N_2$ adsorption-desorption isotherm, which was obtained by the nitrogen adsorption analysis, the specific surface area of a pore was calculated using a Brunauer-Emmett-Teller ("BET") method, the whole volume of the pore was directly deduced from the Y axis of the $N_2$ adsorption-desorption graph, and the pore size distribution was obtained using the Barrett-Joyner-Halenda ("BJH") method. The results thereof are shown in Table 3 below and FIGS. 17C and 18C for the active materials of Preparation Examples 5 to 7 and the mesoporous $SiO_2$ of Comparative Preparation Example 3:

TABLE 3

| | Specific surface area ($m^2/g$) | Total pore volume (mL/g) | Average diameter of mesopore (nm) |
|---|---|---|---|
| Comparative Example 3 | 922 | 1.06 | 6.9 |
| Example 5 | 1021 | 1.31 | 8.7 |
| Example 6 | 1021 | 1.28 | 8.6 |
| Example 7 | 992 | 1.20 | 8.0 |

Figure 17C:
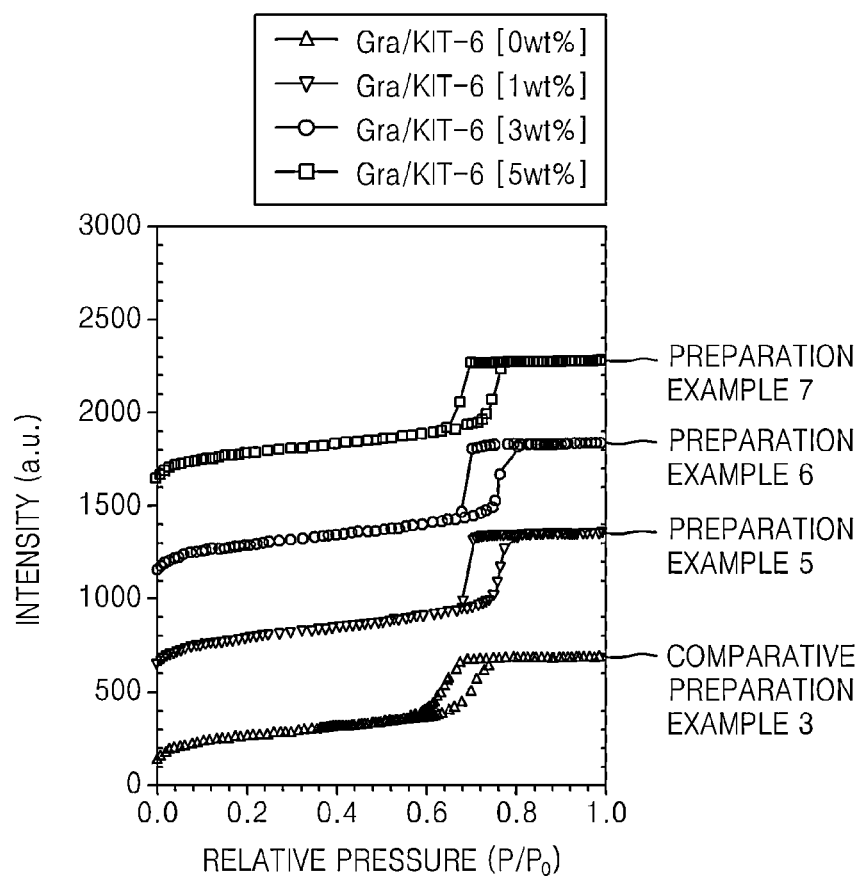
FIG. 17C is a graph of intensity (arbitrary units) versus relative pressure (P/$P_o$) and FIG. 18C is a graph of intensity versus pore diameter (nanometers) showing the results of nitrogen adsorption analysis of the composites including graphene and mesoporous $SiO_2$ of Manufacturing Examples 5 to 7 and the mesoporous $SiO_2$ of Comparative Preparation Example 3.
Figure 18C:
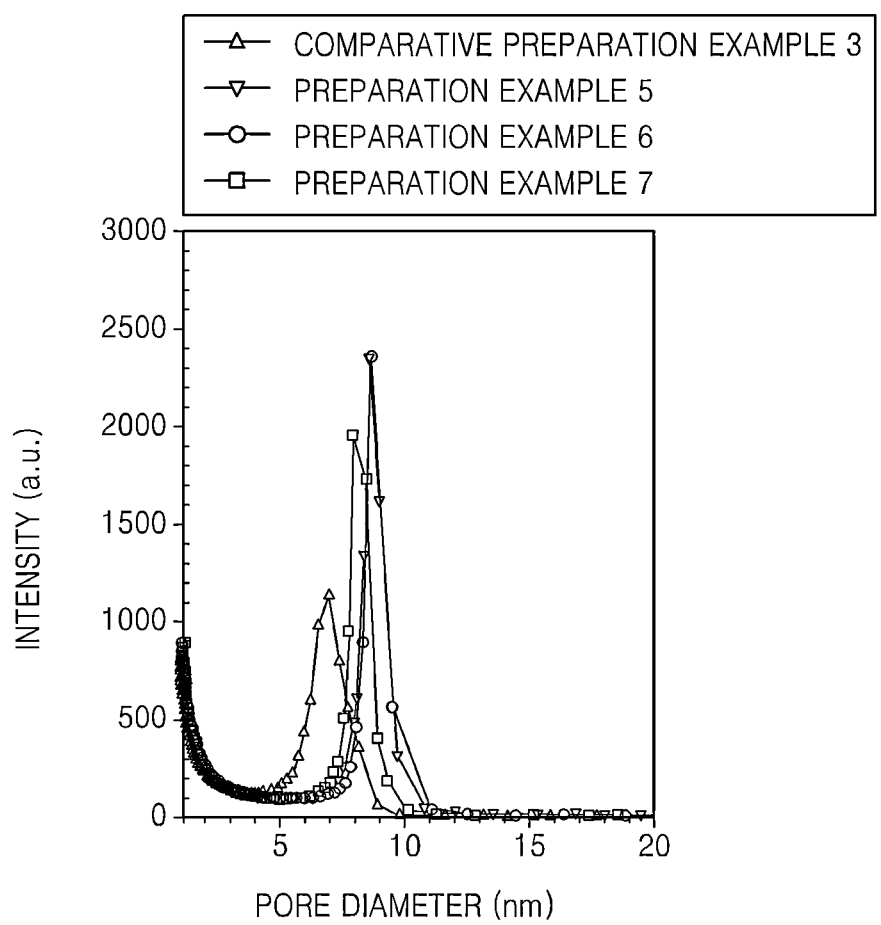

Referring to Table 3 above and FIGS. 17C and 18C, a simple blend of the graphene and the mesoporous $SiO_2$ showed double hysteresis characteristics representing all the characteristics of the CNT and the mesoporous $SiO_2$. However, the composites of Examples 5 to 7 did not show double hysteresis characteristics.

4) Examples 5 to 7 and Comparative Example 1

Nitrogen adsorption analysis was performed on the composites of Examples 5 to 7 and the mesoporous $Mn_3O_4$ of Comparative Example 1.

In the nitrogen adsorption analysis, nitrogen was adsorbed to or desorbed from the respective powder, and from the difference between the amount of the adsorbed nitrogen and the amount of the desorbed nitrogen, a specific surface area, a pore volume, and a pore size distribution were obtained. In detail, from an $N_2$ adsorption-desorption isotherm, which was obtained by the nitrogen adsorption analysis, the specific surface area of a pore was calculated by using a Brunauer-Emmett-Teller ("BET") method, the whole volume of the pore was directly deduced from the Y axis of the $N_2$ adsorption-desorption graph, and the pore size distribution was obtained using the Barrett-Joyner-Halenda ("BJH") method. The results thereof are shown in Table 4 below and FIGS. 17D and 18D for the active materials of Examples 5 to 7 and the mesoporous $Mn_3O_4$ of Comparative Example 1:

TABLE 4

| | Specific surface area ($m^2/g$) | Total pore volume (mL/g) | Average diameter of mesoporous pore (nm) |
|---|---|---|---|
| Comparative Example 1 | 109 | 0.21 | 3.2 |
| Example 5 | 83 | 0.15 | 2.8 |
| Example 6 | 158 | 0.22 | 2.2 |
| Example 7 | 105 | 0.19 | 2.8 |

Figure 17D:
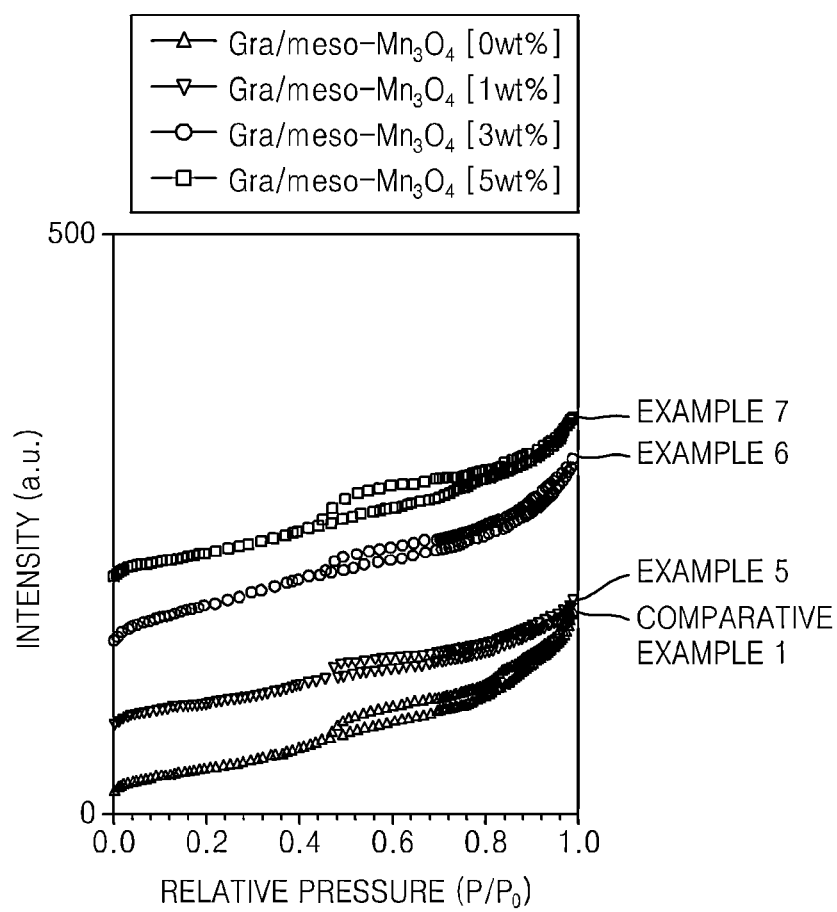
FIG. 17D is a graph of intensity (arbitrary units) versus relative pressure (P/$P_o$) and FIG. 18D is a graph of intensity versus pore diameter (nanometers) showing the results of nitrogen adsorption analysis of the composites of Examples 5 to 7 and the mesoporous $Mn_3O_4$ of Comparative Example 1.
Figure 18D:
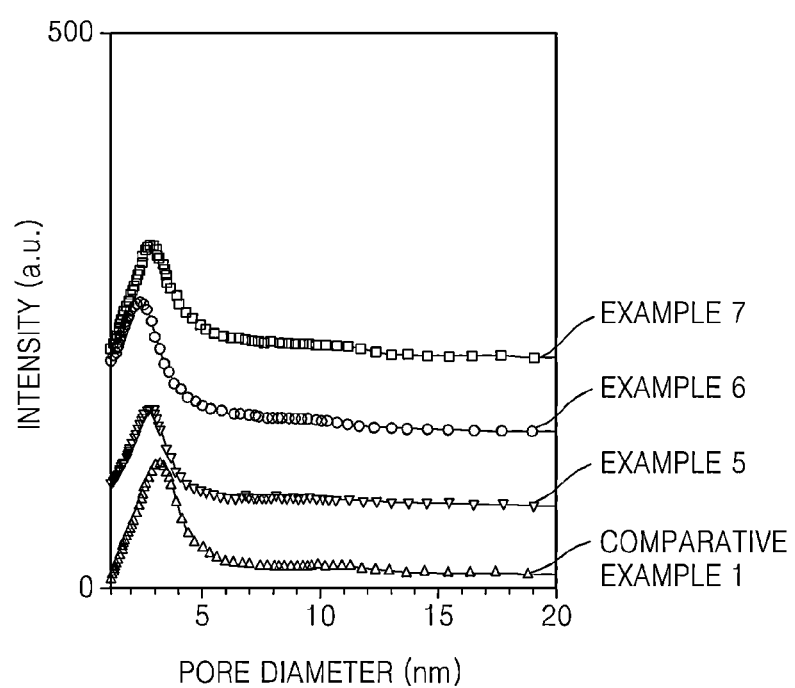

Referring to Table 4 above and FIGS. 17D and 18D, a simple blend of the CNT and the mesoporous $Mn_3O_4$ showed double hysteresis characteristics representing all the characteristics of the CNT and the mesoporous $Mn_3O_4$. However, the electrode active materials of Examples 5 to 7 did not show double hysteresis characteristics. In this regard, it was confirmed that the composites of Preparation Examples 1 to 4 have three dimensional mesoporous structures and include mesopores that were orderly arranged.

Evaluation Example 5: Conductivity Evaluation

1) Examples 2 to 4 and Comparative Example 1

Figure 19:
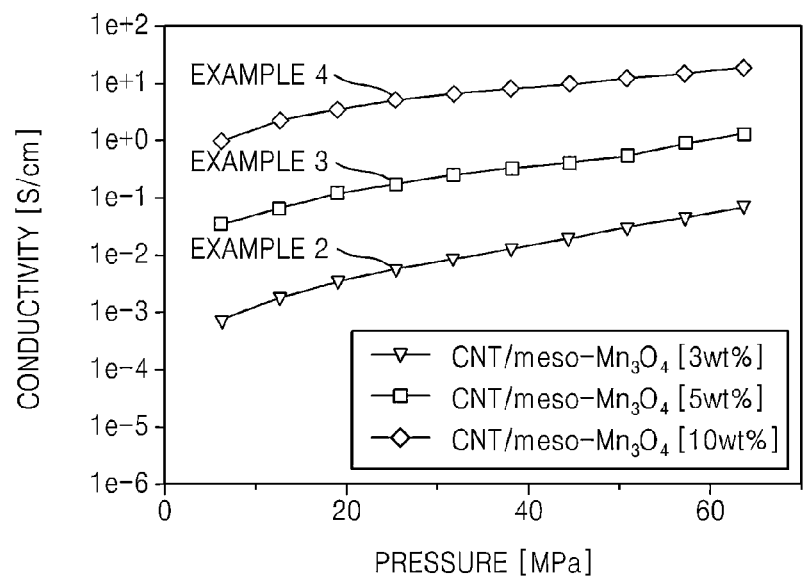
FIG. 19 is a graph of conductivity (Siemens per centimeter, S/cm) versus pressure (megaPascals, MPa) showing the results of conductivity evaluation of the mesoporous $Mn_3O_4$ of Comparative Example 1 and the composites of Examples 2 to 4.

Conductivity of the mesoporous $Mn_3O_4$ of Comparative Example 1 and the electrode active materials of Examples 2 to 4 were evaluated with respect to pressure using a powder resistance measurement system LORESTA series (MCP-PD51), and results thereof are shown in FIG. 19.

Referring to FIG. 19, it was confirmed that conductivity of the mesoporous $Mn_3O_4$ is too high to measure and conductivity of electrode active materials of Examples 2 to 4 were excellent.

2) Examples 5 to 7 and Comparative Example 1

Conductivity of the mesoporous $Mn_3O_4$ of Comparative Example 1 and the electrode active materials of Examples 5 to 7 were evaluated in the same manner described above.

As a result, it was confirmed that the electrode active materials of Examples 5 to 7 have improved capacities and excellent lifetime characteristics compared to the mesoporous $Mn_3O_4$ of Comparative Example 1.

Evaluation Example 6: Charge and Discharge Characteristics Evaluation

1) Examples 1 to 4 and Comparative Example 1

Preparation of Negative Electrode and Lithium Battery 70 mg of the active material powder of Comparative Example 1, 15 mg of a carbon conductive agent (Super-P, Timcal Inc.), and 15 mg of a binder (polyamide/imide, PAI), were mixed with 15 ml of N-methylpyrrolidone (NMP) in an agate mortar to prepare a slurry. The slurry was applied on a copper current collector to a thickness of about 50 μm by using a doctor blade, followed by drying at room temperature for 2 hours and then drying under a vacuum conditioned at a temperature of 200° C. for 2 hours to prepare a negative electrode plate.

A standard CR-2032 coin cell was manufactured using the negative electrode plate, lithium metal as a counter electrode, a polypropylene separator (Celgard 3510) as a separator, and a solution of 1.3 M $LiPF_6$ dissolved in a mixed solution including ethylene carbonate (EC) and diethyl carbonate (DEC)(3:7 weight ratio) as an electrolyte.

Coin cells were manufactured by using the same method described above, except that the active materials of Examples 1 to 4 were used instead of the active material of Comparative Example 1.

Charge and Discharge Test

Lithium batteries including the active materials of Comparative Example 1 and Examples 1 to 4 were charged with a current of 100 mA per 1 g of the respective active materials until the voltage reached 0.001 V (vs. Li) and then, with the same amplitude of current, discharging was performed until the voltage reached 2 V (vs. Li). Consequentially, within the same current and voltage ranges, charging and discharging were repeatedly performed 50 times.

Figure 20:
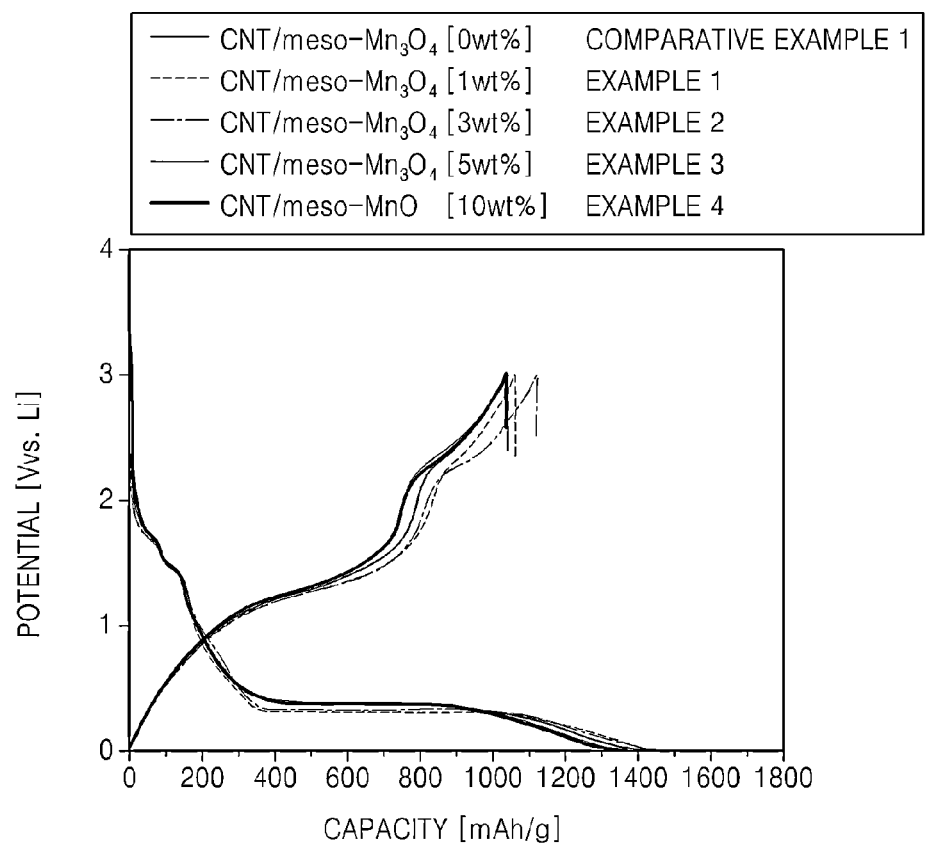
FIG. 20 is a graph of potential (Volts vs. lithium) versus capacity (milliampere-hours per gram) showing the results of charge and discharge testing in the first cycle of lithium batteries including the mesoporous $Mn_3O_4$ of Comparative Example 1 and lithium batteries including the active materials of Examples 1 to 4.

FIG. 20 shows charge and discharge results of the lithium batteries including the active materials of Comparative Example 1 and Examples 1 to 4 in the first cycle. The results show the changes in capacity of the lithium batteries.

Also, the density of the negative electrode, specific capacity (in milliampere-hours per gram (mAh/g)), capacity per cubic centimeter (cc), an initial efficiency, and 50 cycle lifetime ([discharge capacity after 100 cycles/initial discharge capacity]×100(%)) of each of the lithium batteries including the active materials of Comparative Example 1 and Examples 1 to 4 are shown in Tables 5 and 6 below, and FIG. 21. However, in Table 5, in the case of the lithium battery including the active material of Comparative Example 1, a 50 cycle lifetime ([discharge capacity after 50 cycles/initial discharge capacity]×100(%)) is shown.

In Table 5, the lithium battery including the electrode active material of Comparative Example 1 had lifetime at $50^{th}$ cycle obtained by calculation of discharge capacity at $50^{th}$ cycle/discharge capacity at $1^{st}$ cycle]×100.

TABLE 5

| Negative active material | Capacity (mAh/g) | Capacity (mAh/CC) | Initial efficiency (%) |
|---|---|---|---|
| Comparative Example 1 | 1036.47 | 1275.44 | 65.81 |
| Example 1 | 1061.97 | 1375.05 | 66.14 |
| Example 2 | 1121.16 | 1449.61 | 70.34 |
| Example 3 | 1034.67 | 1066.01 | 69.43 |
| Example 4 | 1030.60 | 1182.60 | 69.77 |

TABLE 6

| Negative active material | 50 cycle lifetime (%) |
|---|---|
| Example 1 | 98.5 |
| Example 2 | 96.2 |
| Example 3 | 96.0 |
| Example 4 | 96.5 |

Figure 21:
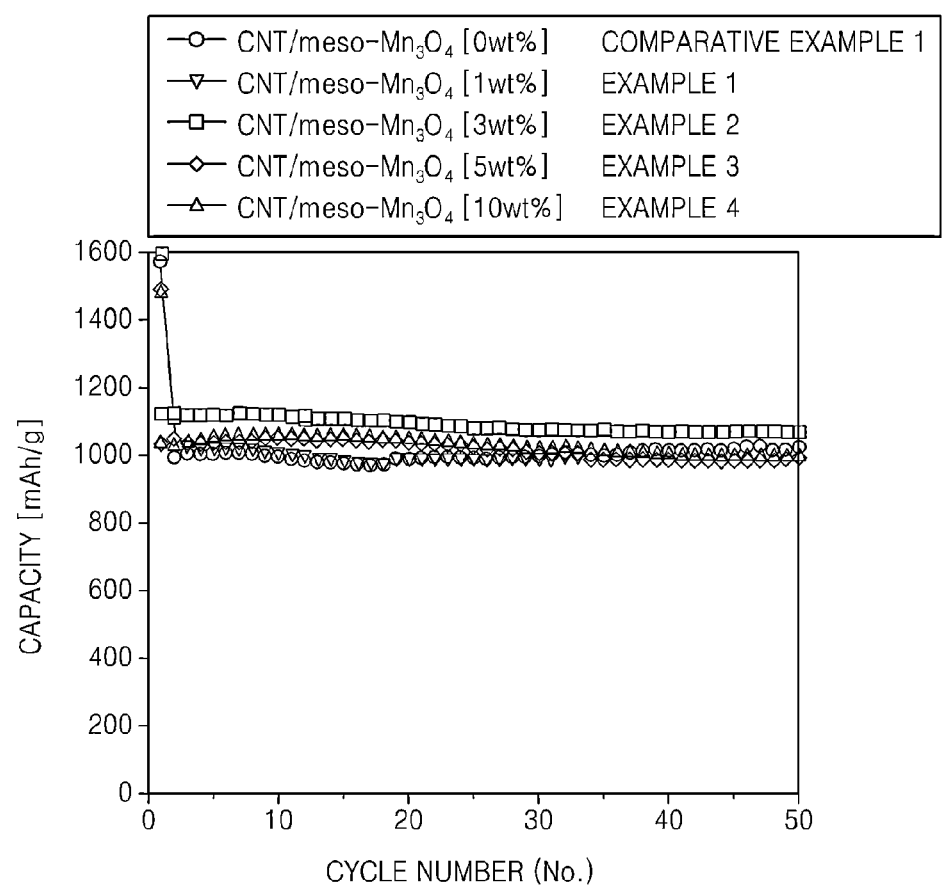
FIG. 21 is a graph of capacity (milliampere-hours per gram) versus cycle number showing lifetime characteristics of lithium batteries including the mesoporous $Mn_3O_4$ of Comparative Example 1 and lithium batteries including the negative electrode active materials of Examples 1 to 4.

Referring to FIG. 21 and Table 5 above, it was confirmed that the lithium batteries including the negative electrodes including the active materials of Examples 1 to 4 have better capacity and initial efficiency than the lithium batteries including the negative electrodes including the active material of Comparative Example 1. Referring to Table 6 above, it was confirmed that the lithium batteries including the negative electrodes including the active materials of Examples 1 to 4 have excellent lifetime.

2) Examples 5 to 7 and Comparative Example 1

The charge-discharge test was performed on lithium batteries in the same manner as in the above, except that the lithium batteries including the active materials of Comparative Example 1 and Examples 5 to 7 were used instead of the lithium batteries including the active materials of Comparative Example 1 and Examples 1 to 4.

From the results, it was confirmed that the lithium batteries employing the negative electrodes including the active materials of Examples 5 to 7 have excellent capacity and lifetime characteristics compared to the lithium batteries employing the negative electrodes including the active material of Comparative Example 1.

As described above, according to the one or more of the above embodiments, a lithium battery including the electrode active material shows excellent capacity and lifetime characteristics in addition to good conductivity.

It should be understood that the exemplary embodiments described herein should be considered in a descriptive sense only and not for purposes of limitation. Descriptions of features, advantages, or aspects within each embodiment shall be considered as available for other similar features, advantages, or aspects in other embodiments.

Although a few embodiments have been shown and described, it would be appreciated by those skilled in the art that changes may be made in this embodiment without departing from the principles and spirit of this disclosure, the scope of which is defined in the claims.

What is claimed is:

1. An electrode active material, comprising:
an ordered mesoporous metal oxide; and
at least one conductive carbon material disposed in a pore of the mesoporous metal oxide,
wherein the ordered mesoporous metal oxide is a manganese oxide represented by Formula 1:

$$Mn_xO_y \qquad \text{Formula 1}$$

wherein $1 \leq x \leq 3$, $1 \leq y \leq 4$, $2 \leq x+y \leq 7$, and $0 < y/x < 2$.

2. The electrode active material of claim 1, wherein the ordered mesoporous metal oxide comprises pores having pore diameters within about ±30% of each other.

3. The electrode active material of claim 1, wherein the conductive carbon material consists of carbon.

4. The electrode active material of claim 3, wherein the conductive carbon material is at least one of graphene, carbon nanotube, carbon black, graphite nanofiber, fullerene, and graphite.

5. The electrode active material of claim 1, wherein the conductive carbon material is embedded in the ordered mesoporous metal oxide, and wherein the conductive carbon material penetrates through the ordered mesoporous metal oxide.

6. The electrode active material of claim 1, wherein pores of the ordered mesoporous metal oxide are connected to each other to form a channel.

7. The electrode active material of claim 1, wherein the ordered mesoporous metal oxide comprises at least one of $Mn_3O_4$ and $MnO_2$.

8. The electrode active material of claim 1, wherein the amount of the conductive carbon material is in a range of about 1 parts by weight to about 10 parts by weight, based on 100 parts by weight of the electrode active material.

9. The electrode active material of claim 1 wherein the ordered mesoporous metal oxide is an ordered mesoporous manganese oxide,
wherein the conductive carbon material is a carbon nanotube or graphene, and
wherein the carbon nanotube or graphene is embedded in the ordered mesoporous manganese oxide.

10. The electrode active material of claim 1, wherein an average diameter of mesopores of the ordered mesoporous metal oxide is in a range of about 1 nanometer to about 50 nanometers.

11. The electrode active material of claim 1, wherein, in an X-ray diffraction pattern of the electrode active material, a peak with respect to a (210) plane appears at a Bragg (2θ) angle in a range of about 0.5° to about 1.5°, when using Cu K-alpha radiation.

12. The electrode active material of claim 1, wherein a specific surface area of the electrode active material is in a range of about 50 $m^2/g$ to about 250 $m^2/g$, and
wherein a volume of mesopores of the mesoporous metal oxide is in a range of about 0.1 $cm^3/g$ to about 2 $cm^3/g$.

13. The electrode active material of claim 1, wherein, when the electrode active material is analyzed by nitrogen adsorption analysis, a double hysteresis is not observed.

14. An electrode comprising the electrode active material of claim 1.

15. A lithium battery comprising the electrode of claim 12.

16. The lithium battery of claim 15, wherein the electrode is a negative electrode.

17. An electrode active material, comprising:
an ordered mesoporous metal oxide; and
at least one conductive carbon material disposed in a pore of the mesoporous metal oxide,
wherein the ordered mesoporous metal oxide is an ordered mesoporous manganese oxide.

18. The electrode active material of claim 17, wherein the conductive carbon material is at least one of a carbon nanotube or graphene.

19. The electrode active material of claim 18, wherein the carbon nanotube or graphene is embedded in the ordered mesoporous manganese oxide.

20. An electrode comprising the electrode active material of claim 17.

21. A lithium battery comprising the electrode of claim 20.

* * * * *